(12) United States Patent
O' Mullane et al.

(10) Patent No.: US 10,883,924 B2
(45) Date of Patent: Jan. 5, 2021

(54) METALLIC GRATINGS AND MEASUREMENT METHODS THEREOF

(71) Applicant: THE RESEARCH FOUNDATION OF STATE UNIVERSITY OF NEW YORK, Albany, NY (US)

(72) Inventors: Sam O' Mullane, Albany, NY (US); Alain C. Diebold, Niskayuna, NY (US); Brennan Peterson, Veldhoven (NL); Nicholas Keller, San Francisco, NY (US)

(73) Assignee: THE RESEARCH FOUNDATION OF STATE UNIVERSITY OF NEW YORK, Albany, NY (US)

( * ) Notice: Subject to any disclaimer, the term of this patent is extended or adjusted under 35 U.S.C. 154(b) by 0 days.

(21) Appl. No.: 14/847,624

(22) Filed: Sep. 8, 2015

(65) Prior Publication Data
US 2016/0069792 A1 Mar. 10, 2016

Related U.S. Application Data

(60) Provisional application No. 62/047,626, filed on Sep. 8, 2014.

(51) Int. Cl.
*G01N 21/21* (2006.01)
*G01B 11/02* (2006.01)
(Continued)

(52) U.S. Cl.
CPC ............ *G01N 21/211* (2013.01); *G01B 11/02* (2013.01); *G01N 21/9501* (2013.01);
(Continued)

(58) Field of Classification Search
CPC ....... G02B 2006/12107; G01N 21/211; G01N 21/9501; G01N 21/956; G01N 2021/213; G01N 2201/0683; G01B 11/02
(Continued)

(56) References Cited

U.S. PATENT DOCUMENTS 3,057,272 A * 10/1962 Greulich ................. E04C 2/423
52/668
3,525,873 A 8/1970 Roblin
(Continued)

OTHER PUBLICATIONS

Wikipedia: Integrated Circuit https://en.wikipedia.org/wiki/Integrated_circuit (Published Mar. 12, 2008) (Year: 2008).*
(Continued)

*Primary Examiner* — Roy M Punnose
(74) *Attorney, Agent, or Firm* — George S. Blasiak, Esq.; Heslin Rothenberg Farley & Mesiti P.C.

(57) ABSTRACT

There is set forth herein in one embodiment, a structure including a metallic grating having a grating pattern, the metallic grating including a critical dimension. The metallic grating can output a spectral profile when exposed to electromagnetic radiation, the spectral profile having a feature. The grating pattern can be configured so that a change of the critical dimension produces a shift in a value of the feature of the spectral profile. A method can include propagating input electromagnetic radiation onto a metallic grating having a two dimensional periodic grating pattern and measuring a critical dimension of the metallic grating using output electromagnetic radiation from the metallic grating.

62 Claims, 22 Drawing Sheets

(51) Int. Cl.
*G01N 21/95* (2006.01)
*G01N 21/956* (2006.01)

(52) U.S. Cl.
CPC ..... *G01N 21/956* (2013.01); *G01N 2021/213* (2013.01); *G01N 2201/0683* (2013.01)

(58) Field of Classification Search
USPC .......................................................... 356/369
See application file for complete search history.

(56) References Cited

U.S. PATENT DOCUMENTS

| | | | |
|---|---|---|---|
| 4,200,396 A * | 4/1980 | Kleinknecht | G01B 11/02 356/394 |
| 4,303,341 A * | 12/1981 | Kleinknecht | G03F 7/70483 250/550 |
| 4,964,726 A * | 10/1990 | Kleinknecht | G01B 11/02 356/496 |
| 5,012,090 A * | 4/1991 | Spillman, Jr. | G01D 5/38 250/226 |
| 5,363,187 A * | 11/1994 | Hagiwara | G01N 21/94 250/559.41 |
| 5,446,521 A | 8/1995 | Hainsey | |
| 5,459,000 A * | 10/1995 | Unno | G03F 7/70091 359/486.02 |
| 5,587,834 A * | 12/1996 | Noguchi | G03F 7/701 355/53 |
| 5,666,197 A | 9/1997 | Guerra | |
| 5,774,221 A | 6/1998 | Guerra | |
| 5,959,325 A * | 9/1999 | Adair | H01L 21/0332 257/302 |
| 6,052,185 A | 4/2000 | Banet | |
| 6,219,144 B1 | 4/2001 | Hill | |
| 6,301,009 B1 | 10/2001 | Tinker | |
| 6,327,039 B1 | 12/2001 | de Groot | |
| 6,351,307 B1 | 2/2002 | Erskine | |
| 6,360,012 B1 | 3/2002 | Kreuzer | |
| 6,469,793 B1 | 10/2002 | Stanton | |
| 6,525,953 B1 * | 2/2003 | Johnson | G11C 17/16 365/63 |
| 6,707,560 B1 | 3/2004 | Naulleau | |
| 6,742,168 B1 | 5/2004 | Nariman | |
| 6,775,015 B2 | 8/2004 | Bischoff | |
| 6,804,005 B2 | 10/2004 | Bischoff | |
| 6,826,223 B1 * | 11/2004 | Meyer | H01S 5/18 372/102 |
| 6,850,858 B1 | 2/2005 | West | |
| 6,912,438 B2 | 6/2005 | Choo | |
| 6,947,141 B2 | 9/2005 | Bischoff | |
| 7,049,633 B2 | 5/2006 | Johnson | |
| 7,064,828 B1 | 6/2006 | Rovira | |
| 7,068,376 B2 | 6/2006 | de Groot | |
| 7,080,330 B1 | 7/2006 | Choo | |
| 7,084,984 B2 | 8/2006 | Hill | |
| 70,091,506 | 8/2006 | Zhang | |
| 7,107,571 B2 | 9/2006 | Chang | |
| 7,119,905 B2 | 10/2006 | Bingham | |
| 7,271,918 B2 | 9/2007 | de Groot | |
| 7,323,905 B2 * | 1/2008 | Madurawe | H01L 27/1203 326/41 |
| 7,324,214 B2 | 1/2008 | de Groot | |
| 7,368,206 B2 | 5/2008 | Fay | |
| 7,369,233 B2 | 5/2008 | Nikoonahad | |
| 7,379,192 B2 | 5/2008 | Bischoff | |
| 7,382,447 B2 * | 6/2008 | Mieher | G03F 7/70625 356/124 |
| 7,426,040 B2 * | 9/2008 | Kim | B82Y 20/00 356/519 |
| 7,427,457 B1 | 9/2008 | Plat | |
| 7,443,486 B2 | 10/2008 | Van Ingen Schenau | |
| 7,461,543 B2 | 12/2008 | Degertekin | |
| 7,564,554 B2 * | 7/2009 | Weiss | G03F 9/7076 356/401 |
| 7,586,623 B2 | 9/2009 | Bischoff | |
| 7,751,046 B2 | 7/2010 | Levy | |
| 7,804,601 B2 | 9/2010 | Hansen | |
| 7,863,647 B1 | 1/2011 | Veliadis | |
| 7,990,549 B2 * | 8/2011 | Walsh | G01B 11/24 356/138 |
| 8,179,530 B2 | 5/2012 | Levy | |
| 8,198,655 B1 * | 6/2012 | Pileggi | H01L 27/0207 257/206 |
| 8,462,345 B2 | 6/2013 | Feng | |
| 8,492,054 B2 * | 7/2013 | Yu | G03F 1/24 430/5 |
| 8,502,979 B2 | 8/2013 | Levy | |
| 8,537,459 B2 | 9/2013 | Nati | |
| 8,554,022 B1 * | 10/2013 | Hochberg | H01L 29/66977 257/21 |
| 8,699,027 B2 | 4/2014 | Wolf | |
| 9,146,193 B2 | 9/2015 | Hines | |
| 9,157,730 B2 | 10/2015 | Rajagopalan | |
| 9,184,549 B2 | 11/2015 | Fermann | |
| 9,239,507 B2 * | 1/2016 | Chen | G02B 6/29328 |
| 9,400,254 B2 * | 7/2016 | Shcherbakov | G01N 21/956 |
| 9,405,063 B2 * | 8/2016 | Lai | G02B 6/12002 |
| 9,436,080 B2 | 9/2016 | Beyer | |
| 9,438,011 B2 * | 9/2016 | Frez | H01S 5/1003 |
| 9,718,296 B2 * | 8/2017 | Rodriguez | B41M 3/10 |
| 9,748,012 B2 * | 8/2017 | Yokoyama | G21K 1/06 |
| 10,153,196 B1 * | 12/2018 | Sills | H01L 27/11585 |
| 10,355,009 B1 * | 7/2019 | Kai | H01L 27/1157 |
| 2002/0018210 A1 | 2/2002 | Maris | |
| 2002/0106848 A1 | 8/2002 | Wack | |
| 2002/0131053 A1 | 9/2002 | de Groot | |
| 2002/0140945 A1 | 10/2002 | de Groot | |
| 2002/0180961 A1 | 12/2002 | Wack | |
| 2002/0192577 A1 | 12/2002 | Fay | |
| 2003/0011786 A1 | 1/2003 | Levy | |
| 2003/0058188 A1 * | 3/2003 | Sambles | H01Q 1/42 343/909 |
| 2003/0200521 A1 * | 10/2003 | DeHon | B82Y 10/00 716/30 |
| 2003/0212525 A1 | 11/2003 | Bischoff | |
| 2003/0234970 A1 | 12/2003 | Phillips | |
| 2004/0073398 A1 | 4/2004 | Nikoonahad | |
| 2004/0092045 A1 | 5/2004 | Bultman | |
| 2004/0115843 A1 | 6/2004 | Wack | |
| 2004/0129900 A1 | 7/2004 | Den Boef | |
| 2004/0150820 A1 | 8/2004 | Nikoonahad | |
| 2004/0235205 A1 | 11/2004 | Levy | |
| 2005/0012928 A1 | 1/2005 | Sezginer | |
| 2005/0046858 A1 | 3/2005 | Hanson | |
| 2005/0053974 A1 * | 3/2005 | Lakowicz | G01N 21/4788 435/6.12 |
| 2005/0104684 A1 * | 5/2005 | Wojcik | B82Y 20/00 333/108 |
| 2005/0285128 A1 * | 12/2005 | Scherer | H01L 33/22 257/98 |
| 2006/0066855 A1 * | 3/2006 | Den Boef | G03F 7/70341 356/401 |
| 2006/0072807 A1 | 4/2006 | Bultman | |
| 2006/0083996 A1 * | 4/2006 | Kim | G03F 7/70566 430/5 |
| 2006/0088792 A1 * | 4/2006 | Ishibashi | G03F 7/70466 430/311 |
| 2006/0109463 A1 | 5/2006 | Den Boef | |
| 2006/0113556 A1 | 6/2006 | Hughes | |
| 2006/0115751 A1 | 6/2006 | Fay | |
| 2006/0139592 A1 | 6/2006 | Den Boef | |
| 2006/0187468 A1 | 8/2006 | Bischoff | |
| 2006/0192936 A1 | 8/2006 | Van Ingen Schenau | |
| 2006/0209413 A1 * | 9/2006 | Kim | B82Y 20/00 359/577 |
| 2007/0046953 A1 | 3/2007 | de Groot | |
| 2007/0127932 A1 | 6/2007 | Qi | |
| 2007/0246844 A1 * | 10/2007 | Do | G03F 7/70625 257/797 |
| 2008/0044741 A1 | 2/2008 | Sarma | |
| 2008/0065350 A1 | 3/2008 | de Groot | |
| 2008/0073572 A1 | 3/2008 | Schwarzl | |
| 2008/0144919 A1 | 6/2008 | Yedur | |

(56) References Cited

U.S. PATENT DOCUMENTS

| | | |
|---|---|---|
| 2008/0259357 A1 | 10/2008 | Bischoff |
| 2009/0002706 A1* | 1/2009 | Weiss ............... G03F 9/7065 356/369 |
| 2009/0041971 A1* | 2/2009 | Wang ............... G02B 5/1809 428/54 |
| 2009/0052073 A1 | 2/2009 | Mann |
| 2009/0152545 A1* | 6/2009 | Su ............... H01L 22/12 257/48 |
| 2009/0279090 A1 | 11/2009 | Wolf |
| 2010/0165134 A1 | 7/2010 | Dowski, Jr. |
| 2010/0283052 A1 | 11/2010 | Sarma |
| 2011/0007314 A1* | 1/2011 | Den Boef ........... G03F 7/70341 356/328 |
| 2011/0229830 A1* | 9/2011 | Bhattacharyya .... G03F 7/70633 430/325 |
| 2011/0305317 A1 | 12/2011 | Yamauchi |
| 2012/0013884 A1 | 1/2012 | Sarma |
| 2012/0064682 A1* | 3/2012 | Jang ............... H01L 27/11578 438/268 |
| 2012/0103408 A1* | 5/2012 | Moslehi ........... H01L 31/022441 136/256 |
| 2012/0162748 A1 | 6/2012 | Fermann |
| 2012/0206703 A1* | 8/2012 | Bhattacharyya ........ G03F 7/705 355/67 |
| 2012/0257204 A1* | 10/2012 | Walters ............... G01N 21/553 356/445 |
| 2013/0035888 A1 | 2/2013 | Kandel |
| 2013/0095650 A1* | 4/2013 | Shimomura ........... H01L 23/528 438/618 |
| 2013/0148194 A1* | 6/2013 | Altug ............... G01N 21/554 359/350 |
| 2013/0208279 A1 | 8/2013 | Smith |
| 2013/0321810 A1 | 12/2013 | Wang et al. |
| 2013/0329279 A1 | 12/2013 | Nati |
| 2014/0055788 A1* | 2/2014 | Den Boef ........... G03F 7/70341 356/453 |
| 2014/0061773 A1* | 3/2014 | Higuchi ............... H01L 29/792 257/326 |
| 2014/0061776 A1* | 3/2014 | Kwon ............... H01L 27/11575 257/329 |
| 2014/0113524 A1 | 4/2014 | Qian |
| 2014/0219296 A1 | 8/2014 | Fermann |
| 2014/0233025 A1* | 8/2014 | Den Boef ........... G03F 7/70341 356/237.5 |
| 2014/0240715 A1 | 8/2014 | Laubscher |
| 2014/0241493 A1* | 8/2014 | Yokoyama ............... C25D 5/34 378/36 |
| 2014/0327898 A1 | 11/2014 | Mann |
| 2014/0358485 A1* | 12/2014 | Lee ............... G03F 7/70625 702/189 |
| 2014/0363121 A1* | 12/2014 | Lai ............... G02B 6/124 385/14 |
| 2014/0375983 A1 | 12/2014 | Wolf |
| 2015/0070673 A1 | 3/2015 | Lalovic |
| 2015/0117808 A1* | 4/2015 | Chen ............... G02B 6/30 385/2 |
| 2015/0170961 A1* | 6/2015 | Romero ............ H01L 21/76816 438/641 |
| 2015/0192858 A1* | 7/2015 | Van De Kerkhof ......... G01N 21/211 355/67 |
| 2015/0203966 A1 | 7/2015 | Budiarto |
| 2015/0233818 A1 | 8/2015 | Manassen |
| 2015/0260663 A1 | 9/2015 | Yun |
| 2016/0049404 A1* | 2/2016 | Mariani ............ H01L 27/1027 257/329 |
| 2016/0061590 A1 | 3/2016 | Pandey |
| 2016/0071260 A1 | 3/2016 | Azordegan |
| 2016/0123720 A1 | 5/2016 | Thorpe |
| 2016/0147164 A1 | 5/2016 | DeVilliers |
| 2016/0161863 A1 | 6/2016 | Den Boef |
| 2016/0342080 A1 | 8/2016 | Beyer |
| 2016/0290796 A1 | 10/2016 | Levy |
| 2016/0313658 A1 | 10/2016 | Marciano |
| 2016/0371908 A1 | 12/2016 | Dow et al. |
| 2019/0067451 A1* | 2/2019 | Ching ............... H01L 21/8239 |
| 2019/0385647 A1* | 12/2019 | Higo ............... H01L 27/105 |

OTHER PUBLICATIONS

M. Bergmair, et al., "Spectroscopic Ellipsometry on Metallic Gratings," *Ellipsometry at the Nanoscale*, p. 257-311, (2013).

S. O'Mullane, et al., "Enhancing One Dimensional Sensitivity with Plasmonic Coupling," *Optical Society of America—Optics Express*, vol. 22, No. 21, pp. 26246-26253 Oct. 20, 2014.

H. Wormeester, et al., "Thin Films of Nanostructured Noble Metals," *Ellipsometry at the Nanoscale*, p. 225-256, (2013).

R. Adato, et al., "Ultra-sensitive vibrational spectroscopy of protein monolayers with plasmonic nanoantenna arrays," *P. Natl. Acad. Sci. USA* 106 (46), 19322-19327 (2009).

J. Zhang, et al., "Coupling between semiconductor quantum dots and two-dimensional surface plasmons," *Phys. Rev. B* 72, 201306 (2005).

H. Svavarsson, "Fabrication and characterization of large, perfectly periodic arrays of metallic nanocups," *Plasmonics* 7, 652-657 (2012).

W. Srituravanich, et al., "Plasmonic nanolithography," *Nano Lett.* 4, 6 (2004).

B. Singh, et al. "Surface plasmon resonance enhanced transmission of light through gold-coated diffraction gratings," *Anal. Chem.* 80, 3803-3810 (2008).

Z. Sun, et al., "Role of surface plasmons in the optical interaction in metallic gratings with narrow slits," *Appl. Phys. Lett.* 83, 3021 (2003).

R. Antos, et al., "Spectroscopic ellipsometry on lamellar gratings," *Appl. Surf. Sci.* 244, 225-229 (2005).

H. Huang, et al. "Spectroscopic ellipsometry and reflectometry from gratings (Scatterometry) for critical dimension measurement an in situ, real-time process monitoring," *Thin Solid Films* 455-456, 828-836 (2004).

R. Antos, et al., "Convergence properties of critical dimension measurements by spectroscopic ellipsometry on gratings made of various materials," *J. Appl. Phys.* 100, 054906 (2006).

T. Constant, et al. "Direct mapping of surface plasmon dispersion using imaging scatterometry," *Appl. Phys. Lett.* 102, 251107 (2013).

X. Chen, et al. "Formulation of error propagation and estimation in grating reconstruction by a dual-rotating compensator Mueller matrix polarimeter," *Thin Solid Films* (2014).

T. Germer, et al. "Developing an uncertainty analysis for optical scatterometry," *Proc. SPIE* 7272, 72720T (2009).

X. Chen, et al. "Measurement configuration optimization for accurate grating reconstruction by Mueller matrix polarimetry," *J. Micro-Nanolith. MEM* 12(3), 033013 (2013).

E. Munos-Pineda, et al. "Symmetries and relationships between elements of the Mueller matrix spectra of the cuticle of the beetle *Cotinis mutabilis*," *Thin Solid Films* (2013).

P. West, et al., "Searching for better plasmonic materials," *physics optics* 0911.2737, Mar. 1, 2010.

T. Schuster, et al. "Normal vector method for convergence improvement using the RCWA for crossed gratings," *J. Opt. Soc. Am. A* 24, 9 (2007).

K. Yoon, et al., "Design optimization of nano-grating surface plasmon resonance sensors," *Opt. Express* 14, 4842-4849 (2006).

H. Li, et al., "Unexpected unidirectional perfect absorption of light in a freestanding optical thin metallic grating with extremely small filling factor," *J. Opt. Soc. Am. B* 31, 4 (2014).

Dec. 28, 2015; International Search Report in International Application No. PCT/US2015/048913.

Dec. 28, 2015; Written Opinion in International Application No. PCT/US2015/048913.

X. F. Li and S. F. Yu, "Extremely high sensitive plasmonic refractive index sensors based on metallic grating," *Plasmonics* 5, 389-394 (2010).

J. Henzie, M. Lee, and T. Odom, "Multiscale pattering of plasmonic metamaterials," *Nat. Nanotechnol.* 2, 549-554 (2007).

(56) References Cited

OTHER PUBLICATIONS

C. Settens, B. Bunday, B. Thiel, R. Kline, D. Sunday, C. Wang, W. Wu, and R. Matyi, "Critical dimension small angle X-ray scattering measurements of FinFET and 3D memory structures," Proc. SPIE 8681, 86810L (2013).

S. Maier, *Plasmonics: Fundamentals and Applications* (Springer, 2007).

H. Kim, C. Detavenier, O. van der Straten, S. Rossnagel, A. Kellock, and D. Park, "Robust $TaN_x$ diffusion barrier for Cu interconnect technology with sub-nanometer thickness by metal organic plasma-enhanced atomic layer deposition," J. Appl. Phys. 98, 14308 (2005).

* cited by examiner

METALLIC GRATINGS AND MEASUREMENT METHODS THEREOF

CROSS REFERENCE TO RELATED APPLICATIONS

This application claims the benefit of priority of U.S. Provisional App. No. 62/047,626 entitled "METALLIC GRATINGS AND MEASUREMENT METHODS THEREOF" filed Sep. 8, 2014, which is incorporated herein by reference in its entirety. International Patent App. No. PCT/US2015/048913 entitled "METALLIC GRATINGS AND MEASUREMENT METHODS THEREOF" filed on Sep. 8, 2015 is incorporated by reference herein in its entirety.

FIELD

The present disclosure relates to gratings and measurement methods using gratings, and more particularly to metallic gratings and measurement methods using metallic gratings.

BACKGROUND

Over the past several decades, the semiconductor industry has continued to increase semiconductor device density by reducing critical dimensions of device structures, such as transistors. During the fabrication of semiconductor devices, structures must be fabricated within specified tolerances of their critical dimensions. Deviation from the specified tolerances will lead to faults, causing yield loss and increased overall costs. Therefore, techniques for validating fabrication accuracy are desirable.

BRIEF DESCRIPTION

The shortcomings of the prior art are overcome, and additional advantages are provided, through the provision, in one aspect, of a metallic grating. The metallic grating has a grating pattern, the metallic grating including a critical dimension; wherein the metallic grating outputs a spectral profile when exposed to electromagnetic radiation, the spectral profile having a feature; wherein the grating pattern is configured so that a change of the critical dimension produces a shift in a value of the feature of the spectral profile.

In another aspect, a metallic grating is presented. The metallic grating has a grating pattern, the metallic grating including a critical dimension; wherein the metallic grating outputs a spectral profile when exposed to electromagnetic radiation, the spectral profile having a feature; wherein the grating pattern is configured so that the feature of the spectral profile shifts by more than 1% per 1 Å change in the critical dimension.

In another aspect, a semiconductor structure is presented. The semiconductor structure comprises: multiple circuit device structures supported on a substrate; and a test structure supported on the substrate, the test structure comprising a metallic grating, the metallic grating having a two dimensional periodic grating pattern.

In another aspect a method is presented. The method comprises: propagating input electromagnetic radiation onto a metallic grating having a periodic two dimensional periodic grating pattern; and measuring a critical dimension of the metallic grating using output electromagnetic radiation from the metallic grating.

Additional features and advantages are realized through the techniques of the present disclosure. Other embodiments and aspects of the disclosure are described in detail herein and are considered a part of the claimed disclosure.

BRIEF DESCRIPTION OF THE SEVERAL VIEWS OF THE DRAWINGS

One or more aspects of the present disclosure are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Aspects of the present disclosure and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the disclosure in detail. It should be understood, however, that the detailed description and the specific examples, while indicating aspects of the disclosure, are given by way of illustration only, and not by way of limitation. Various substitutions, modifications, additions, and/or arrangements, within the spirit and/or scope of the underlying inventive concepts will be apparent to those skilled in the art from this disclosure.

It was observed that techniques for validating fabrication processes and tools can make use of test structures. The test structures may be fabricated using the same processes as the semiconductor devices, by making appropriate modifications to the mask works employed in the fabrication of the semiconductor devices. In one example, after formation of transistor devices, metallic lines must be fabricated to interconnect various portions of the transistor devices, such as sources, drains, and gates. The deposition of these metallic lines may use damascene processes, in which metallic lines are formed in lithographically patterned and formed trenches. By adapting the mask works, the same metallic line deposition process may be used to create test structures. These structures may then be examined in close detail to determine whether or not the processes are operating within the specified tolerances. As critical dimensions continue to shrink beyond the nanometer scale, it was observed that measurement techniques at such dimensions are desired.

Figure 1A:
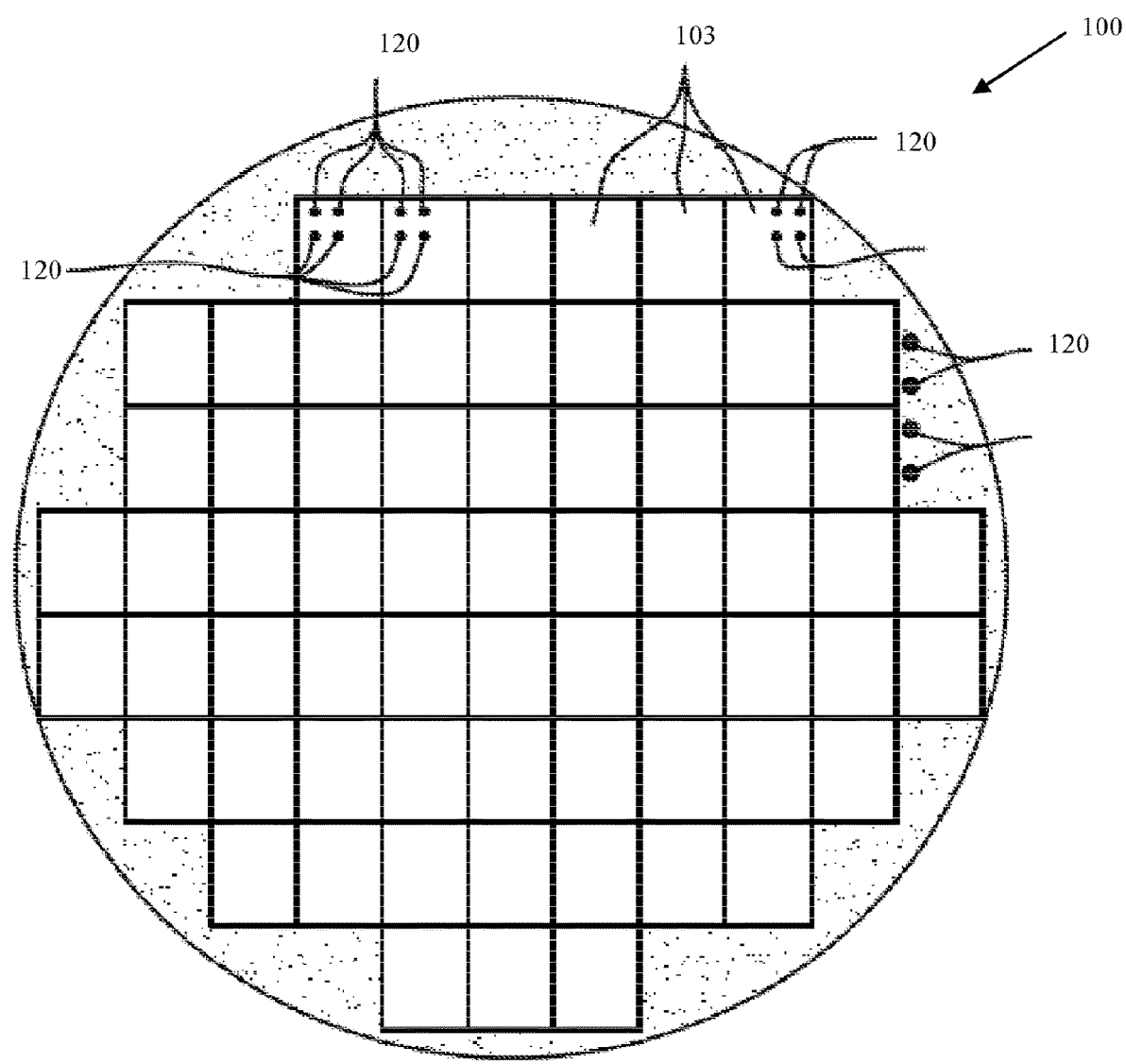
FIGS. 1A-1D depict a semiconductor structure, as set forth herein.

FIGS. 1A-1D depict a semiconductor structure 100 having test structures 120 with metallic gratings, as set forth herein. Semiconductor structure 100 can be e.g. a semiconductor wafer, a semiconductor die, or an integrated circuit chip. FIG. 1A depicts a plan view of semiconductor wafer. The present disclosure provides, at least in part, metallic gratings and measurement methods using metallic gratings. By way of example, semiconductor structure 100 may include multiple integrated circuits or chips. The multiple chips may be located in individual dies 103 of the wafer. Numerous chips may be fabricated at once, and after fabrication, semiconductor structure 100 may be diced, and the individual dies 103 packaged as finished microchips having various integrated circuits. In addition, during the fabrication process, test structures 120 may be fabricated. The test structures may be located within some or all of the dies of the semiconductor wafer, or may be located in the curf or scribe region of the semiconductor wafer, along which the dicing described above will later take place.

Figure 1B:
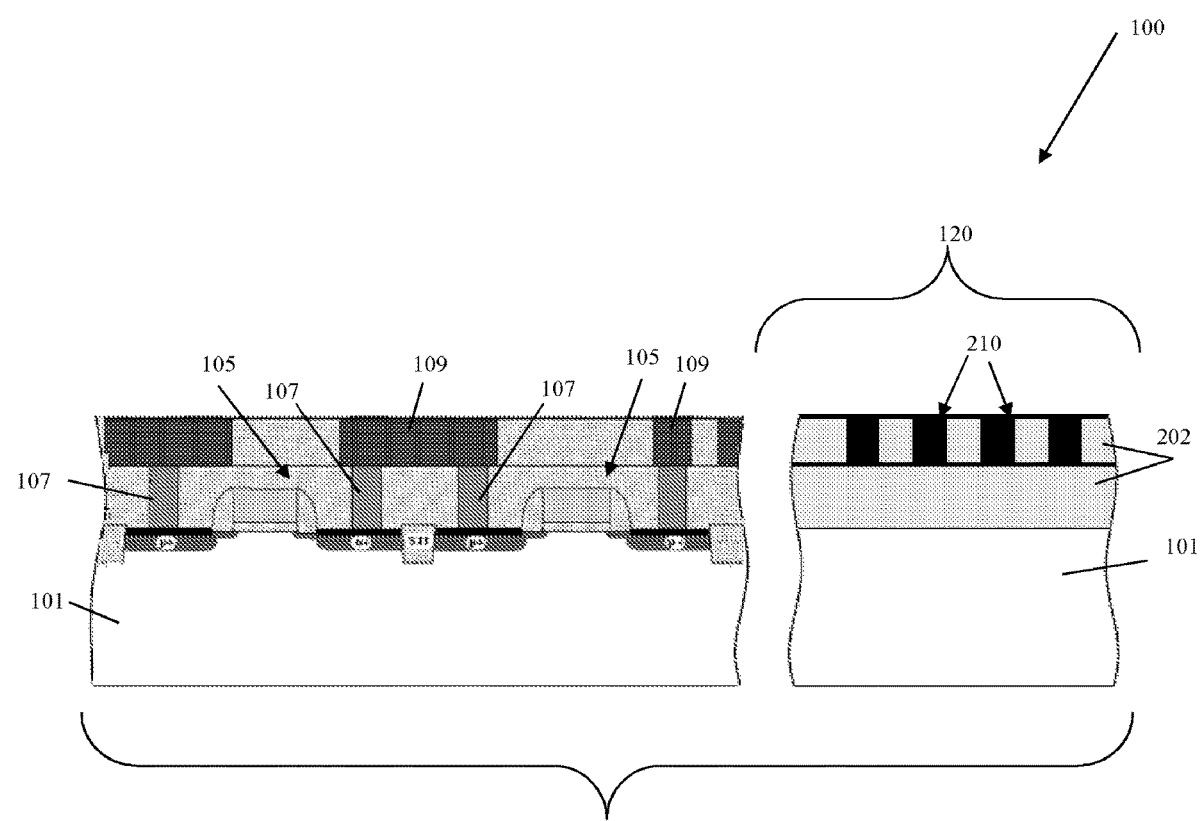

During the fabrication process, various steps of lithographic patterning, etching, and materials deposition may be used to form integrated circuit structures. By adjusting the set of masks used, the test structures described above may be formed at the same time and using the same formation processes and materials as the semiconductor devices, such as field-effect transistors (FETs) 105, as depicted in FIG. 1B. Referring to FIG. 1B a semiconductor structure 100 can include a semiconductor circuit supported on a substrate 101, e.g. an Si substrate. The semiconductor circuit can have a plurality (multitude) of circuit devices, e.g. FETs 105, a plurality of metal contact lines 107 and plurality of metal interconnect lines 109. Semiconductor structure 100 can be fabricated so that further supported on substrate 101 can be test structure 120. In one embodiment, test structure 120 can have a metallic grating 210 disposed on an isolation layer 202 which can be deposited on substrate 101. For example, after formation of transistor devices on the substrate, multiple layers of metallization may be formed over the transistors to interconnect the transistor devices. When forming transistors with the highest density, or smallest critical dimensions, it is important that the formed metallic lines meet the specified tolerances of the design rules. For example, a width of the metallic lines may nominally be X nm+/−0.1 nanometers (nm).

By forming, for example, first test structures during the formation of the first metallization layer, second test structures during the formation of the second metallization layer, and so forth, the processing techniques may be validated and verified by examination of the test structures. Following the example above in which metallic lines are to have a nominal width of X nm, the test structure metallic lines may be measured to determine whether or not they are within the allowed range. If they are not, the tools and/or processes may be tuned or adjusted to reach the desired goals.

Figure 1C:
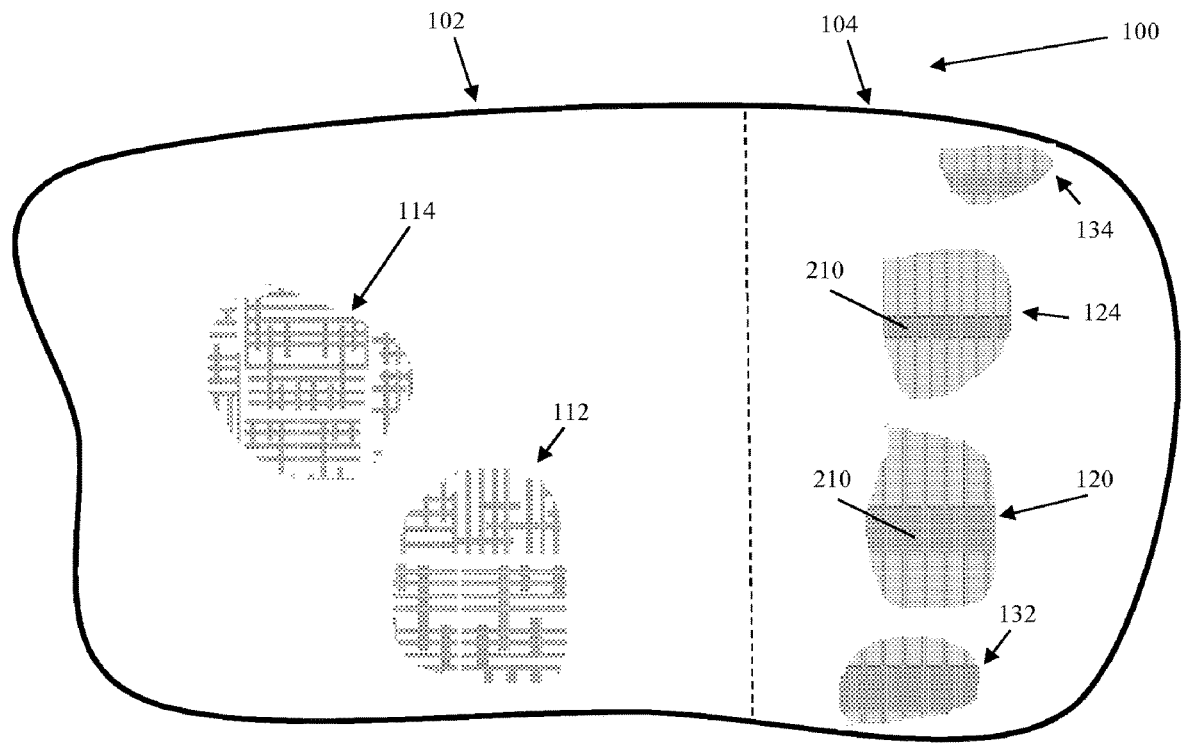

Semiconductor structure 100 as shown in FIG. 1C can include a circuit area 102 and a test area 104. Circuit area 102 can include first circuit region 112 having a plurality of semiconductor circuit devices, e.g. FETs and metallic lines and second circuit region 114 having a plurality of semiconductor devices, e.g. FETs and metallic lines. In the embodiment of FIG. 1C, semiconductor structure 100 can include a circuit area and a spatially separated test area. In another embodiment, semiconductor structure 100 can include test area co-located with a circuit area. In one embodiment, circuit elements under test within a circuit area of a semiconductor structure 100 can define metallic gratings and be configured to output spectral profiles as are set forth herein with respect to various embodiments of metallic grating 210. In such an embodiment, the circuit elements under test can be subject to measurement without use of a test structure spatially separated from the circuit elements.

Referring to test area 104, test area 104 can include one or more test structures. First test structure 120 having a metallic grating 210 can be adapted for testing of first circuit region 112 and second test structure 124 having a metallic grating 210 can be adapted for testing of second circuit region 114. First circuit region 112 can have a first type of circuit features, e.g. source/drain (S/D) contact lines having a first critical dimension and pitch, and second circuit region 114 can have a second type of circuit features, e.g. gate contact lines, or interconnect lines having a second critical dimension and pitch. In one embodiment, first test structure 120 can be repeated at area 132 and second test structure 124 can be repeated at area 134.

Figure 1D:
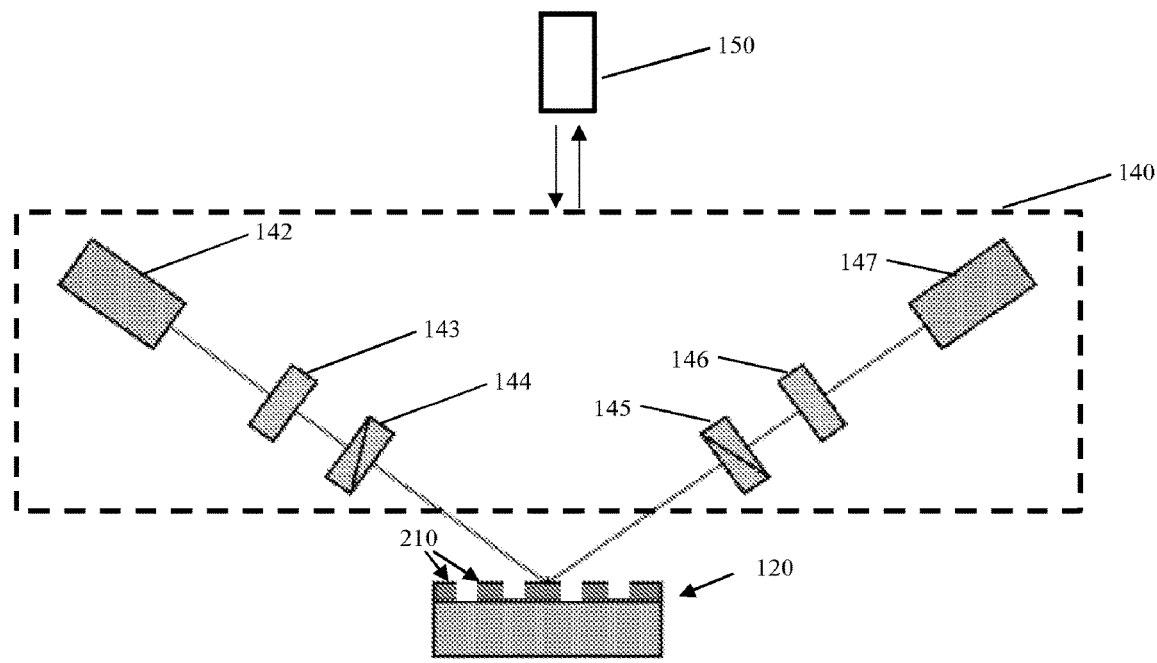

A setup for testing of semiconductor structure 100 is shown in FIG. 1D. Semiconductor structure 100 can be tested with ellipsometry or reflectometry using an ellipsometer 140 and a reflectometer 150 respectively. For example, in one embodiment, reflectometry may be polarized normal incidence reflectometry. Ellipsometer 140 can include a light source 142, a first polarizer 143, a first compensator 144, a second compensator 145, a second polarizer 146, and a detector 147. In the embodiment of FIG. 1C, each of the ellipsometer 140 and the reflectometer 150 are adapted to direct a light spot at test structure 120 including a metallic grating 210 and to detect returned radiation from test structure 120. In another embodiment, each of the ellipsometer 140 and the reflectometer 150 can be adapted to direct a light spot at test structure 124 and to detect returned radiation from test structure 124. In another embodiment, ellipsometer 140 and reflectometer 150 can be ellipsometers and reflectometers respectively of an Atlas II Advanced Optical (OCD) Metrology System available from Nanometrics Incorporated of Milpitas, Calif. In another embodiments, spectroscopic ellipsometric data can also be obtained using ellipsometers that employ optical paths that measure some or all of the Mueller matrix elements, or just $\psi$ or $\delta$, as described in Fujiwara, Hiroyuki, *Spectroscopic Ellipsometry: Principles and Applications*, Wiley (2007). In a further embodiment, ellipsometer 140 can be a VUV-VASE Ellipsometer available from J.A. Woollam Co. of Lincoln, Nebr.

The metallic gratings described herein advantageously enhance the critical dimension sensitivity as compared to so-called one dimensional nanometer scale metal gratings. In one embodiment, because of the interaction between changes in refractive index and localized plasmons, sub-angstrom scale sensitivity may be achieved with the metallic gratings of the present disclosure. The metallic gratings of the present disclosure show robust spectra dependent mostly on the dimension of the smaller linewidth and pitch and demonstrate picometer resolution.

A plasmons is the quasi-particle that describes coupling of light with a collective oscillation of electrons. Structures can be tuned to excite plasmons when very specific conditions are met. Plasmons can be used for nanoscale sensing of biological materials, as sensors for material properties, as part of an alternative lithography method, and to boost performance of existing devices.

The nanometer scale metallic gratings described herein, in one embodiment display extraordinary sensitivity at least in part due to plasmonic activity. An implementation of rigorous coupled wave analysis (RCWA) may be used as an accurate simulation tool of non-destructive optical measurements of periodic gratings. For example, there has been good agreement between RCWA and critical dimension (CD) measurements and plasmon effects. As described herein, in one embodiment metallic gratings can be altered to produce distinct plasmonic peaks that enhance sensitivity to CD.

Typically, RCWA simulations show a smooth and continuous variation over a range of physical and valid parameters. Comparing these to experimental data obtained from an ellipsometer, one can fit parameters such as CD, side wall angle, height, etc. For example, commercially available analysis software includes Nano CD Suite available from Nanometrics, Incorporated, of Milpitas, Calif.

Ellipsometry is an optical technique in which input electromagnetic radiation with known parameters, such as amplitude, frequency, and polarization interacts with a structure, and output electromagnetic radiation from the structure is analyzed based on changes in those parameters, yielding information about the structure. An ellipsometric measurement may use spot areas (or beam areas) with a spot size directed at the test structure.

The spectral results described herein are presented in terms of the Mueller matrix element $M_{12}$. At an angle of incidence of 65 degrees along the length of the grating lines, a sample can be characterized fully by the spectroscopic ellipsometry variables $\psi$ and $\delta$ where $M_{12}=-\cos 2\psi$. Note that if the angle the projection of the incident light makes with the grating is not a multiple of $$\frac{\pi}{2},$$

the full Mueller matrix may be needed to characterize the structure. In an embodiment with an incident angle of $$\frac{\pi}{2}$$

there are only 3 unique nondegenerate values ($M_{12}$, $M_{34}$ and $M_{44}$). For example, in one embodiment surface plasmons can appear as dips in the spectra for $\psi$ and hence also for $M_{12}$ due to absorption of transvere magnetic (TM) polarized light for the given conditions.

Reference is made below to the drawings, which are not drawn to scale for ease of understanding, wherein the same reference numbers used throughout different figures designate the same or similar components.

Figure 2:
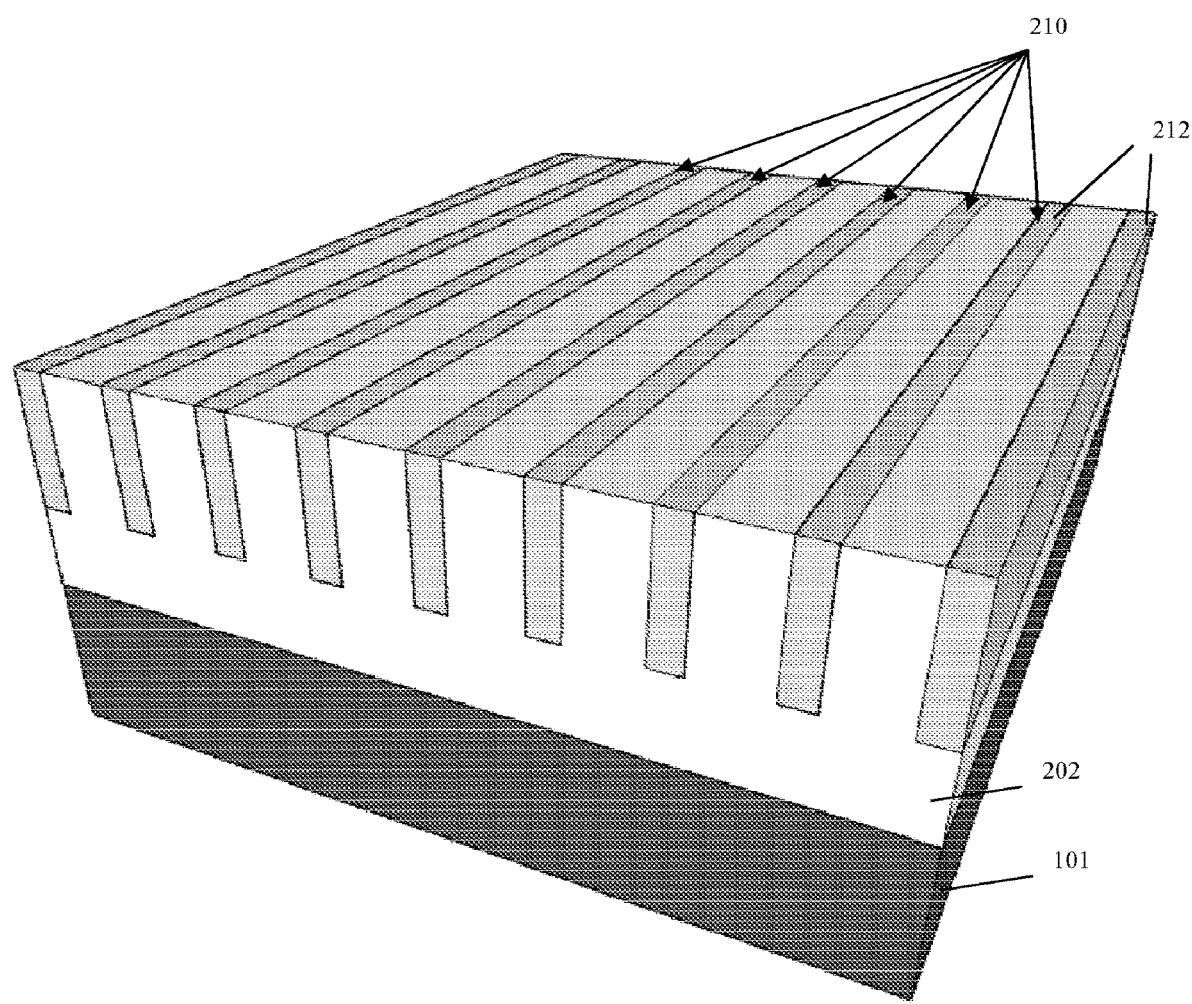
FIG. 2 is an isometric view illustrating a metallic grating having a grating pattern including multiple metallic lines, as set forth herein.

FIG. 2 is an isometric view illustrating a metallic grating 210 having multiple metallic lines, as set forth herein. As illustrated, metallic grating 210 is disposed over a substrate 101, which may be, for example a semiconductor material, such as silicon. An isolation layer 202 is disposed around metallic grating 210. In one embodiment, isolation layer 202 is silicon dioxide. Metallic gratings 210 in one embodiment can include grating patterns that periodically repeat in two dimensions, with the depicted grating pattern including metallic lines repeating thousands, millions, or more times to tile a planar section of the substrate, thereby forming a test structure. A semiconductor wafer may be or include substrate 101. In one example, the metal grating may be or include copper. In another example, the metal grating may be or include cobalt.

In one example, the metallic grating may be surrounded by a barrier layer to prevent diffusion of the material of the metallic grating. In one specific case, a thin tantalum nitride (TaN) barrier layer of 6 Å can be used to prevent Cu diffusion. In the embodiment of FIG. 2, metallic grating 210 can have a grating pattern including a plurality of vertical metallic lines 212.

Figure 3:
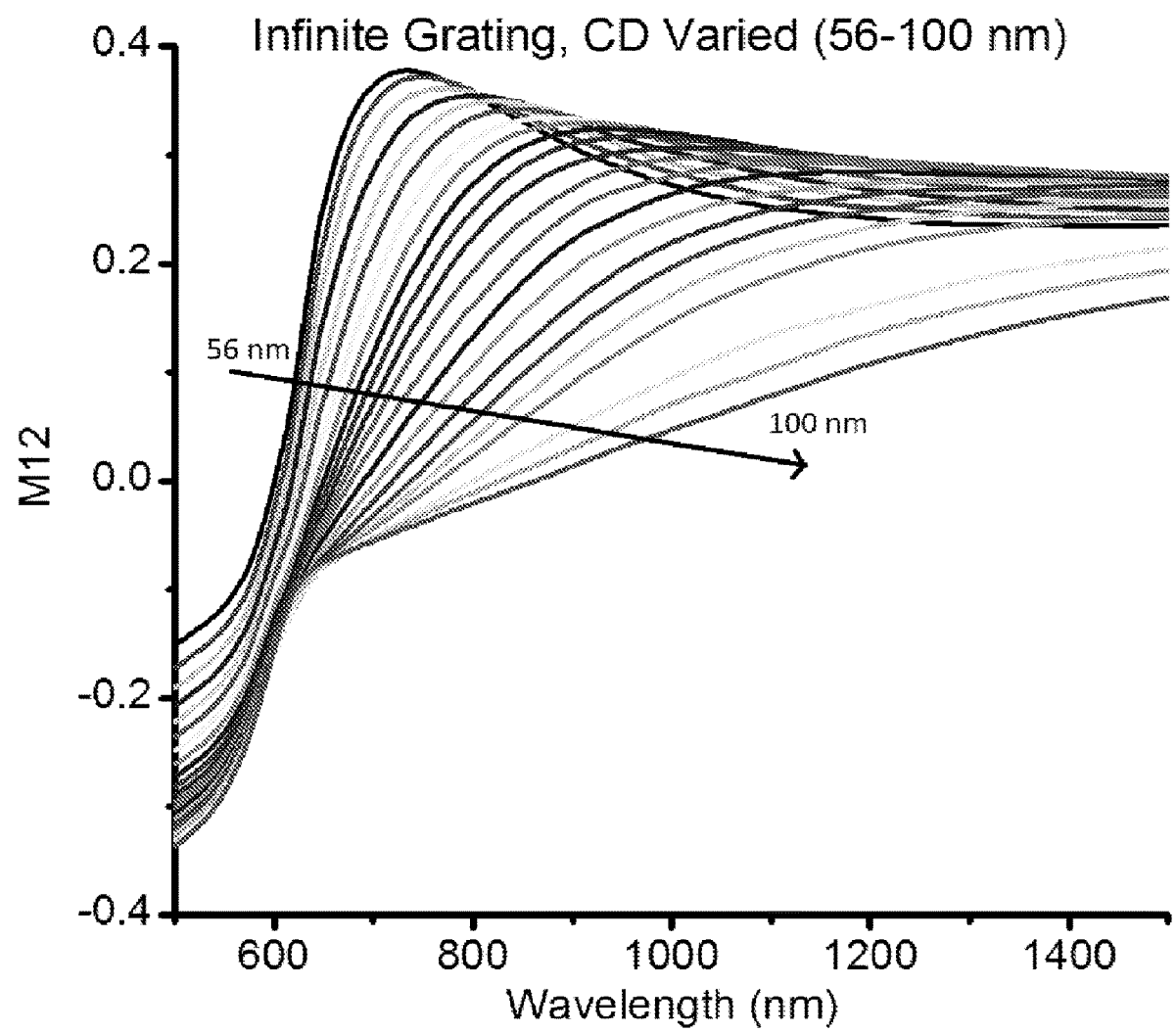
FIG. 3 is a graph of a spectral profile of the metallic grating illustrated in FIG. 2, as set forth herein.

FIG. 3 is a graph of a spectral profile of the metallic grating illustrated in FIG. 2, as set forth herein.

The spectral profile illustrated is for a silicon substrate, copper metallic grating, and a silicon dioxide isolation layer. The metallic grating is 50 nm tall and the isolation layer extends 20 nm below the metallic grating. The distance $P_x$ (pitch) between metallic lines (from left to right) is 120 nm. The linewidth, or critical dimension, of vertical metallic lines 212 varies by $\Delta CD=2$ nm, and ranges from 56 nm to 100 nm. Each curve in the spectral profile represents $M_{12}$ of the output electromagnetic radiation, as a function of wavelength, for each of the different metallic gratings having the different critical dimensions stepping from 56 nm to 100 nm. The illustration shows a gradual change in the shape of each spectral curve, for the different metallic gratings having different critical dimensions.

The experimental results may be compared with theory. In one embodiment, for metallic gratings, incident light can couple with free electrons to produce surface plasmon polaritons. This process can be approximated by simple conservation of momentum:

$$\vec{k}_{in}=m\vec{k}_{G_x}+n\vec{k}_{G_y}+\vec{k}_{SP} \quad [\text{Eq. (1)}]$$

In [Eq. (1)], $\vec{k}_{in}$ is the photon incident to the plane surface and parallel to the thin grating, $\vec{k}_G$ are the grating vectors inversely proportional to their periods, and $\vec{k}_{SP} \propto \sqrt{\epsilon_{cu}\epsilon_{dielectric}/(\epsilon_{cu}\epsilon_{dielectric})}$ is the surface plasmon wavevector. The m and n are the order of the grating mode.

For the case of a one dimensional grating (e.g, a so-called infinite grating in which the line lengths are extremely long compared to other dimensions, so that only one dimension varies and influences electromagnetic properties) with a pitch of 120 nm, little or no measureable plasmonic activity can be generated as this period is much too small to allow for effective coupling. As illustrated, although there is minor variation in the spectra, this separation can only be used to separate structures that have linewidth differences on the order of nanometers. That is because roughness and local variation in structure would increase the amount of curve fitting required and thus the overall error, limiting how much useful information can be taken from the spectra.

One feature in the spectral profile from 575 to 650 nm arises from the dielectric function of copper because interband transitions begin to occur at 2.08 eV or 596 nm.

Figure 4A:
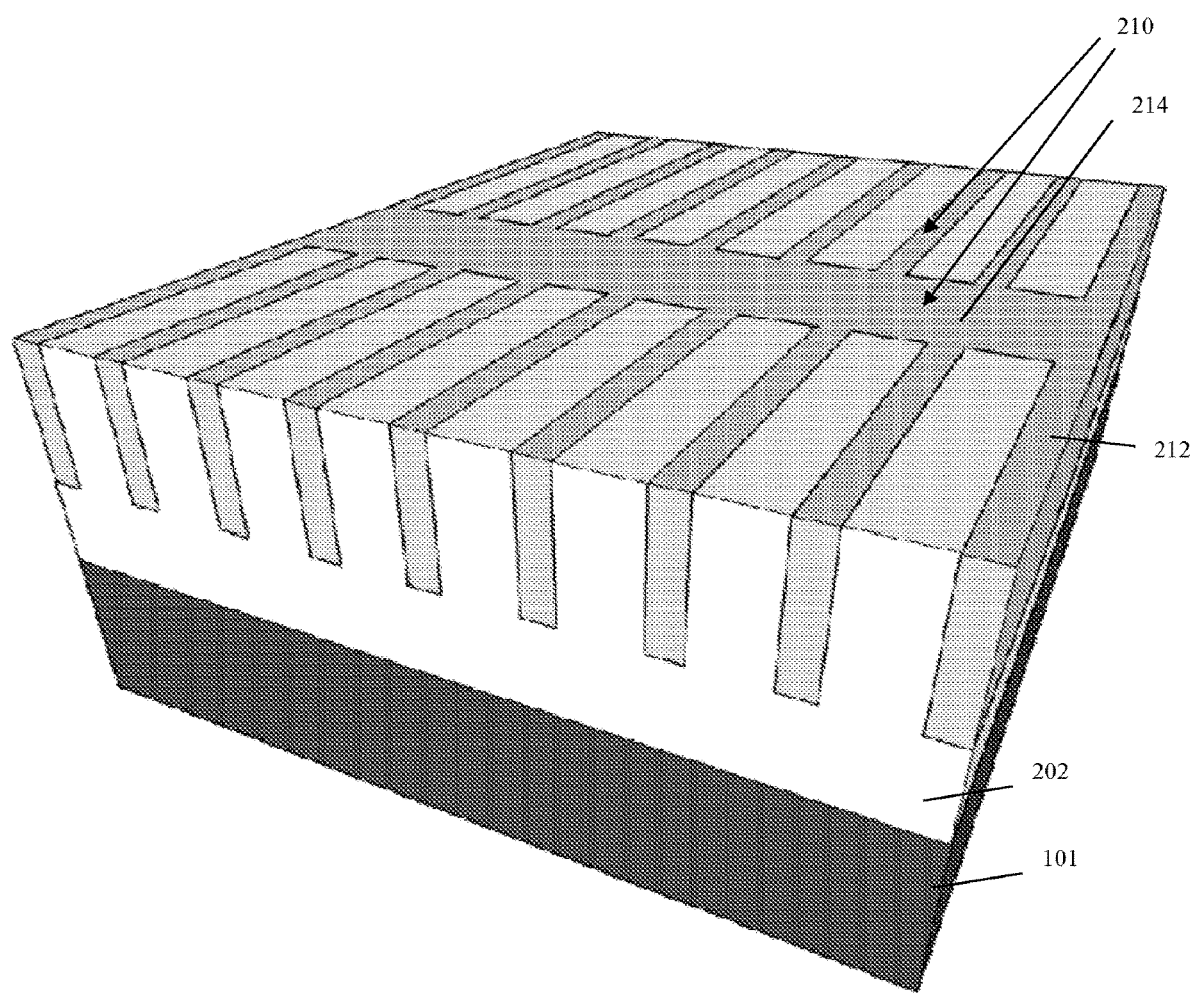
FIGS. 4A-4D are views illustrating metallic gratings having grating patterns including at least one metallic crossbar, as set forth herein.
Figure 4B:
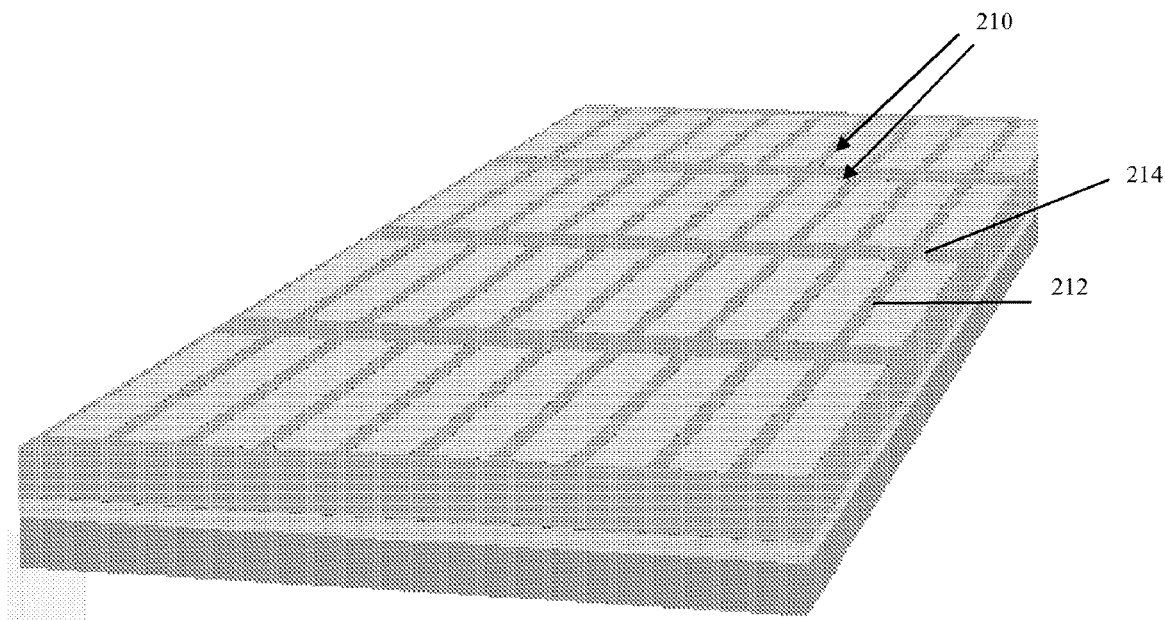
Figure 4C:
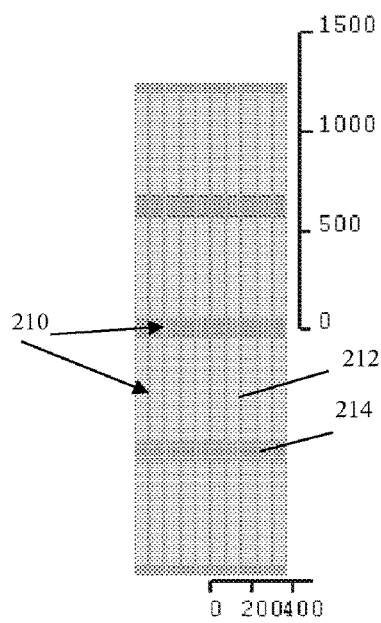
Figure 4D:
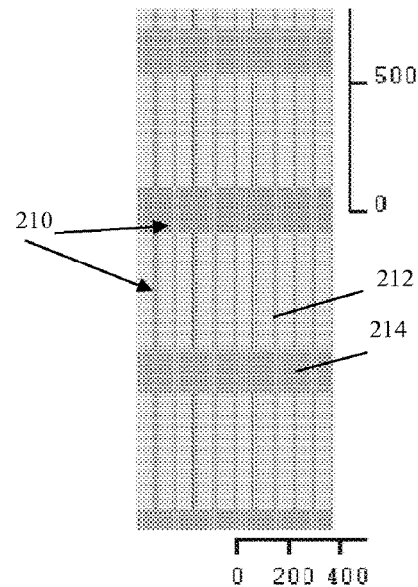

FIGS. 4A-4D are views illustrating a metallic grating 210 having vertical metallic lines 212 and at least one horizontal line provided by a horizontal metallic line 214 (cross bar), as set forth herein. FIG. 4A depicts a detailed view of a portion of metallic grating 210, which may be disposed over and supported by substrate 101. As mentioned with respect to FIG. 2, a grating pattern of a metallic grating 210 may include a grating pattern that is repeated in two dimensions multiple times, such as tens, hundreds, thousands, or more times to tile a portion of substrate 101, as depicted in FIG. 4B. For example, FIG. 4C illustrates a repeating pattern of metallic lines 212 in one direction and metallic lines 214 in a perpendicular direction.

Advantageously, in one embodiment metallic grating 210 as shown in FIGS. 4A-4D, which may be called an infinite cross-grating, can demonstrate plasmonic coupling. The added crossbar can be approximately an order of magnitude larger for both pitch and linewidth and is thus termed the larger dimension. This structure can be easily modified to shift the CD sensitive region as needed by varying the pitch or linewidth of either dimension. In addition, metallic grating 210 as show in FIGS. 4A-4D with features sizes smaller than 50 nm and period larger than 500 nm are largely unaffected by rounding or structure irregularity. The patterns of the depicted embodiments represent some examples of the kinds of patterns that exhibit the spectral profiles described herein. Other embodiments of grating patterns for metallic gratings may be employed.

Figure 5:
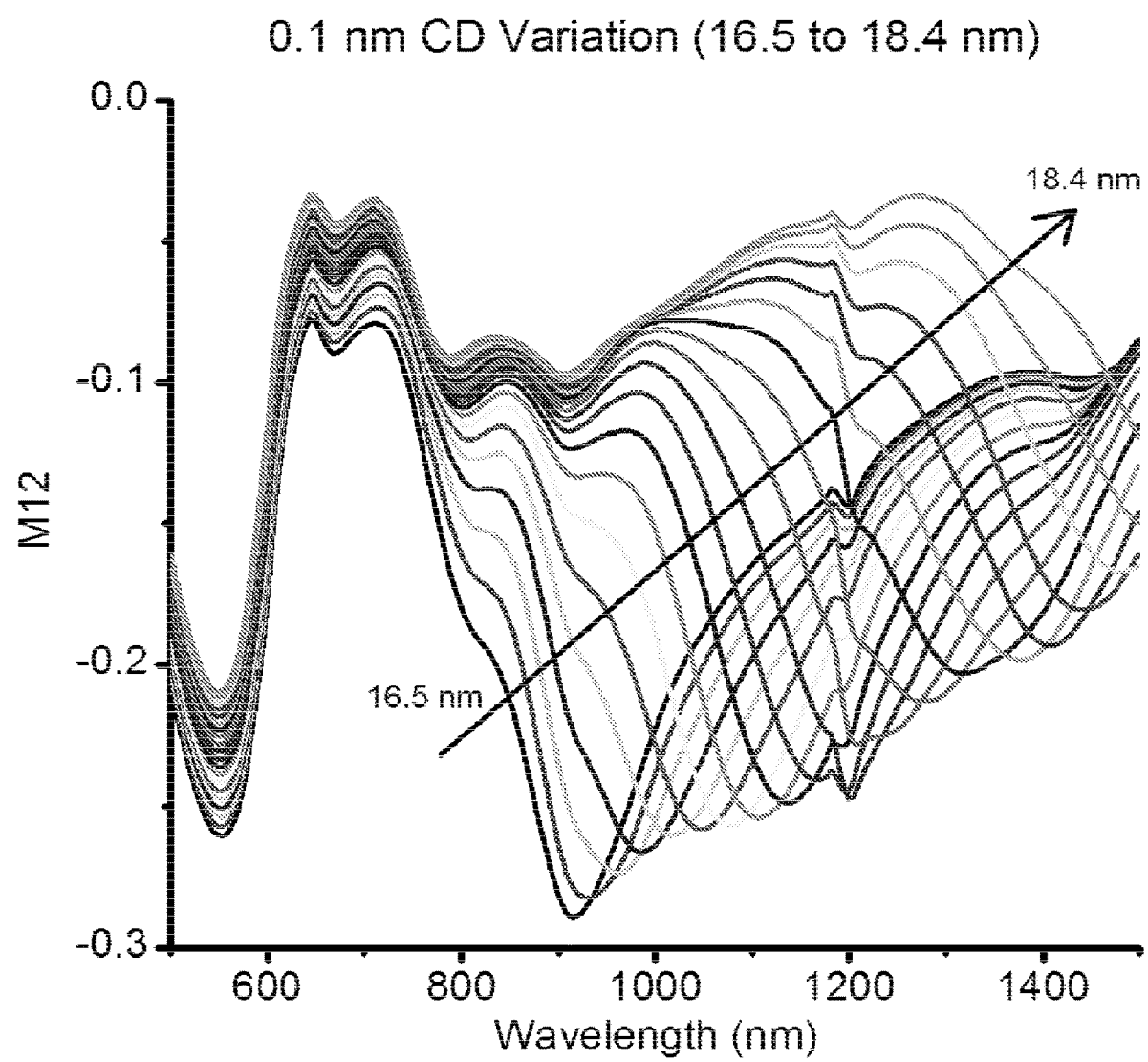
FIG. 5 is a graph of a spectral profile of the metallic grating illustrated in FIG. 4A, as set forth herein.

FIG. 5 is a graph of a spectral profile of the metallic grating illustrated in FIG. 4A, as set forth herein. The spectral profile illustrated is for a silicon substrate, copper metallic grating, and a silicon dioxide isolation layer. The metallic grating can be 50 nm tall and the isolation layer extends 20 nm below the metallic grating. The distance $P_x$ between metallic lines (from left to right) is 75 nm. The distance $P_y$ between crossbars is 620 nm. The linewidth, or critical dimension, of the vertical metallic lines varies by A CD=0.1 nm, and ranges from 16.5 nm to 18.4 nm.

Each curve in the spectral profile represents $M_{12}$ of the output electromagnetic radiation, as a function of wavelength, for each of the different metallic gratings having the different critical dimensions stepping from 16.5 nm to 18.4 nm. The illustration shows a dramatic change in the shape of each spectral curve, for the metallic gratings having varied critical dimensions. Each spectral curve now has a distinct minimum of $M_{12}$ dependent upon the linewidth of the metallic lines 212.

As illustrated, a metallic grating outputs very specific spectral profiles when exposed to electromagnetic radiation, having very specific local minimum feature with respect to frequency of $M_{12}$, depending on the critical dimension, which in this example is the line width. The spectral profiles have a feature, such as a local minimum of the spectral profile, and as seen, a change of the critical dimension of the grating pattern produces a shift in a value of the feature of the spectral profile. This dramatic result can be made use of in the following example. If, in fabricating semiconductor devices, a critical dimension of 17 nm is targeted, metallic gratings such as described in FIG. 4A can be patterned and formed in a test structure. Next, ellipsometry may be used to measure the spectral profile of the test structure, and the local minimum of $M_{12}$ determined. Because of the large wavelength separation of $M_{12}$ for critical dimensions ranging from 16.5 nm to 18.4 nm in the present example, the actual critical dimensions of the test structures, including the metallic gratings therein, may be measured. If the actual critical dimensions deviate from the nominal target, 17 nm in this example, the tools and processes may be tuned accordingly, to ensure optimal yield of semiconductor devices in the fabrication process.

Looking at the spectras, in one embodiment, variation (between 600 and 1200 nm) can be due to, for example, localized plasmons. Localized plasmons can be caused by small changes in the effective refractive index of the structure.

For reference, the locations of the minima are presented below in Tab. 1.

| | CD (nm) | | | | | | | | |
|---|---|---|---|---|---|---|---|---|---|
| | 16.5 | 16.6 | 16.7 | 16.8 | 16.9 | 17.0 | 17.1 | 17.2 | 17.3 |
| Dip location | 915 | 931 | 965 | 989 | 1017 | 1048 | 1081 | 1108 | 1169 |

As seen, the minima shifts up (redshift) by 2.7% of its initial location per 1 Å increase in CD on average.

Note the presence of a small dip in the spectra beginning at $\lambda$=1188 nm which is due to the first order plasmon polariton effect. This dip is predicted theoretically by the grating coupling seen in [Eq. (1)] making use of the dielectric function of copper. For increasing larger dimension periods, this dip redshifts as expected until it is outside the range. Importantly, the sensitivity of the structure is largely unaffected by this dip, the exception being in its immediate vicinity. Since this effect is an order of magnitude smaller than the main feature of the spectra and there is no CD sensitivity associated with it, the structure can be designed to omit its presence.

Figure 6A:
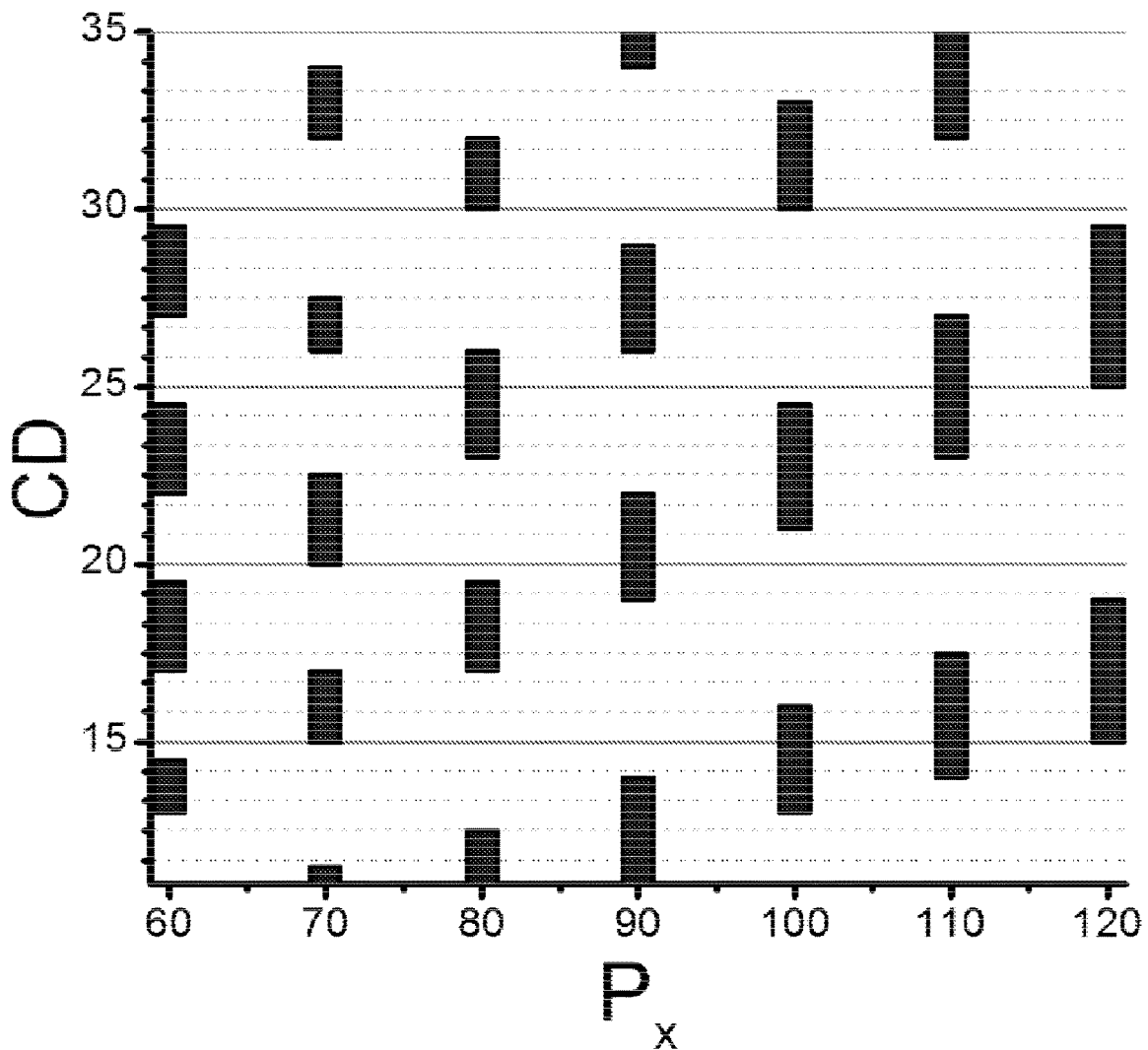
FIG. 6A is a co-variation graph of pitch and critical dimension of the metallic grating illustrated in FIG. 4A, as set forth herein.

FIG. 6A is a co-variation graph of pitch and critical dimension of the metallic grating illustrated in FIG. 4A, as set forth herein. In FIG. 5, each bar represents the window in which a plasmonic resonance is visible in the spectra above 800 nm resulting in CD sensitivity. In this example, $P_y$=875 nm, $L_y$=100 nm, $\Delta P_x$=10 nm, $\Delta CD$=0.5 nm.

This graph is important because experimentally, there are often limitations placed on what structures can be produced given the materials and desired design. The most challenging quantities to vary are the smaller dimension linewidth and period. To ensure that the metallic gratings disclosed herein are useful for whatever CD or $P_x$ is produced, the graph shows two important trends. In one embodiment, each metallic grating demonstrates equivalent sensitivity over a certain range of CDs summing to about one-third of the total range. In another embodiment, there is a general trend visible based on the fill factor—the ratio of area filled by the grating to the total area, which is expected due to the nature of localized surface plasmons.

As an example, the ranges centered about ($P_x$=60, CD=13.5),(70,16),(80,19), etc. all have fill factors near 0.315. This also explains the trend of increasing range of sensitive CDs as the fill factor for both lower and upper limits remains approximately equal. Further discussion on this fill factor connection and variation of the larger dimension pitch will be explained with respect to FIGS. 16-18. Sensitivity holds for CD changes less than 10 picometers allowing for picometer scale sensitivity when the peaks are fitted appropriately.

Figure 6B:
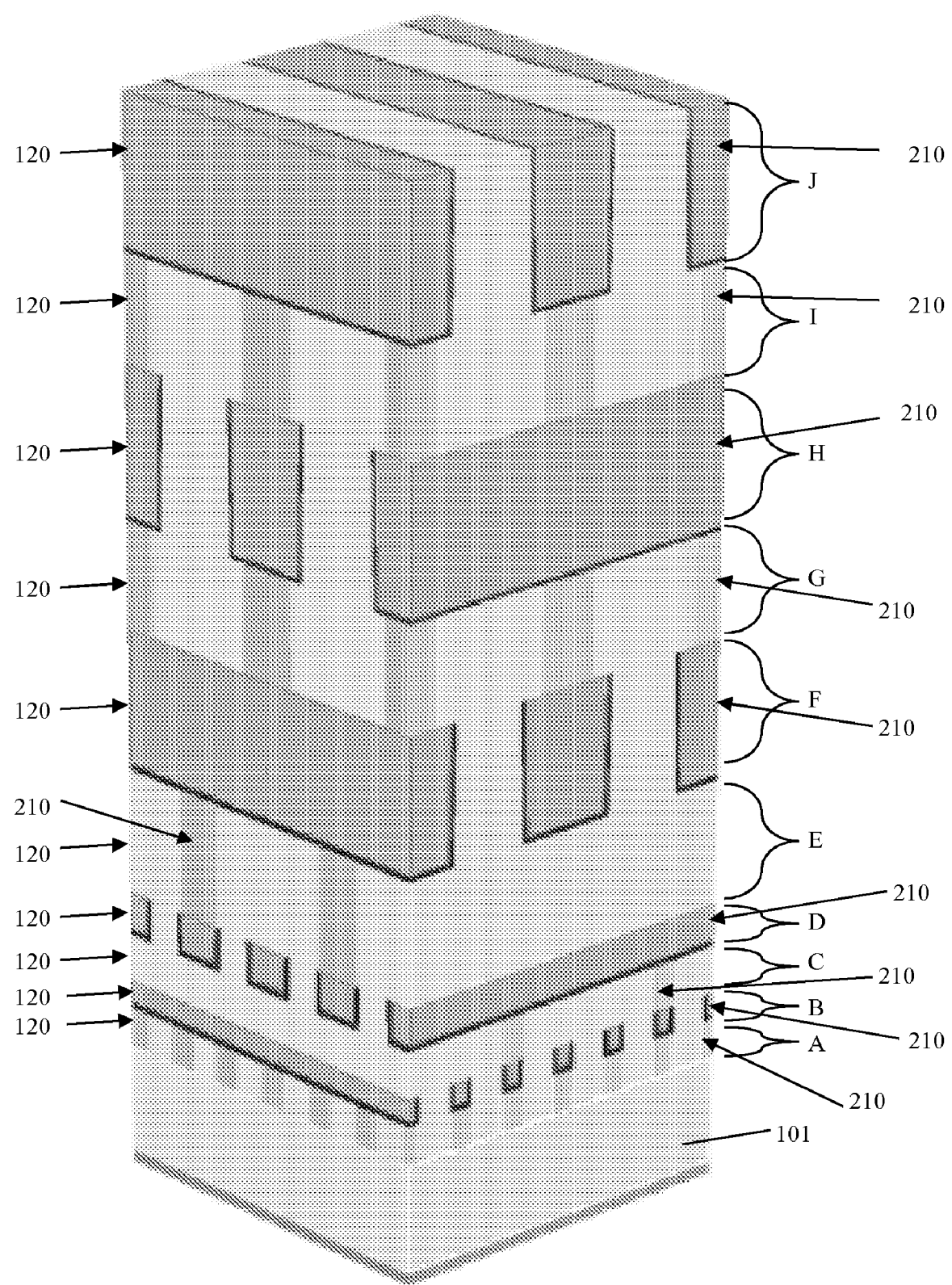
FIG. 6B is a view illustrating test structures having metallic gratings, as set forth herein.

FIG. 6B is a view illustrating test structures 120 having metallic gratings, as set forth herein. Test structures 120 are present at numerous elevation levels of the semiconductor structure, and in particular at elevations levels A-J. In one embodiment, there may be e.g. 2 to 20 or more elevation levels. Each elevation level can correspond to a metallization layer added to form interconnects of an integrated circuit.

Test structures 120 illustrated in FIG. 6B (which can be spatially separated from a circuit element under test or co-located with a circuit element under test) can make use of the spectral properties illustrated in FIG. 6A. In particular, test structures 120, at different elevation levels A-J, can be fabricated to correspond to different interconnect layers. For example a set of test structures can be configured so that spectral profiles of the set of test structures can be coordinated. Coordination between spectral profiles of a set of test structures can be provided in one embodiment by tuning the spectral profiles so that local minimum and/or local minimum of the spectral profiles do not overlap or overlap a reduced amount. Accordingly, a sensitivity range provided by a set of test structures can be increased. Coordination between spectral profiles can also be provided by tuning the spectral profiles so that electromagnetic radiation transmission through test structures closer to a source of electromagnetic radiation is increased.

In one embodiment, coordination may be achieved by choosing different pitches from, for example, the graph of FIG. 6A, such that the different pitches have non-overlapping ranges of critical dimensions (e.g., linewidths). For example, this could be done by alternating slotted grating layers over metal lines or by shifting critical dimensions of cut lines into various regions.

Advantageously, test structures 120 depicted in FIG. 6B allow for a plurality of critical dimensions to be tested at different elevation levels (e.g., elevation levels A-J) corresponding to different metallization levels (e.g., metal 1, metal 2, and so forth). The set of stacked test structures 120 shown in FIG. 6B define a set of stacked metallic gratings 210. In one embodiment, the test structures 120 as shown in FIG. 6B can include structures that function to interconnect the stacked metallic gratings 210. In another embodiment, test structures 120 can be absent of structures that interconnect metallic gratings 210 of the set of stacked metallic gratings 210. In one embodiment, a test structure 120 as set forth herein can be provided by a metallic grating 210 and can be absent any other element.

Figure 7:
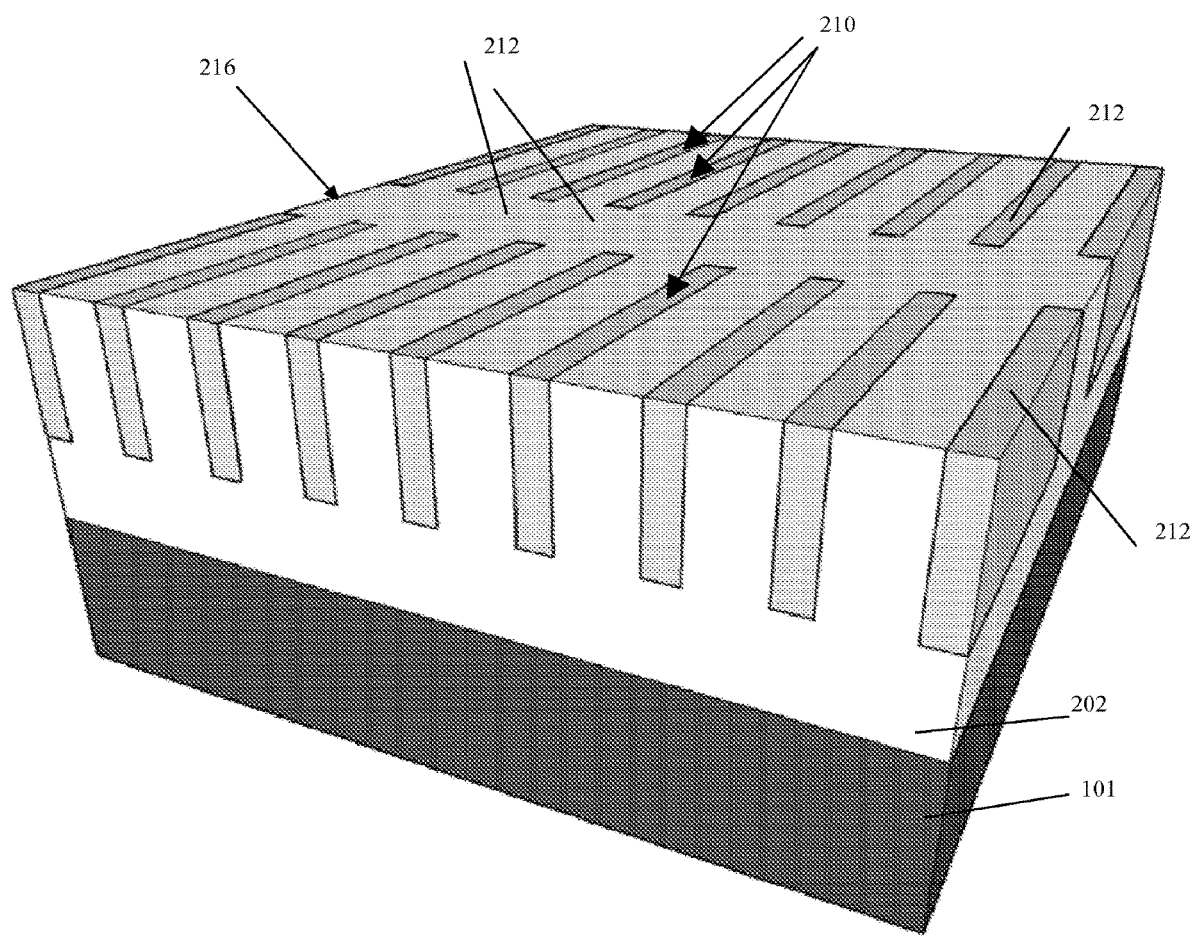
FIG. 7 is an isometric view illustrating a metallic grating having periodic gaps in metallic lines thereof, as set forth herein.

FIG. 7 is an isometric view illustrating a metallic grating 210 having periodic gaps in vertical metallic lines 212 thereof, as set forth herein. The spectral profile illustrated is for a silicon substrate, copper metallic grating, and a silicon dioxide isolation layer. In the metallic grating 210 illustrated in FIG. 7, horizontal lines 216 are defined by gaps 215 between vertical metallic lines 212. The metallic grating 210 can be 50 nm tall and the isolation layer can extend 20 nm below metallic grating 210. In this example, $P_y$=620 nm ("pitch," the center spacing between horizontal lines 216), $L_y$=100 nm, and $P_x$=75 nm (pitch of the vertical metallic lines 212). The linewidth, or critical dimension, of the metallic lines 212 varies by $\Delta CD$=0.1 nm, and ranges from 16.5 nm to 18.4 nm. This metallic grating is called a "finite" grating.

Figure 8:
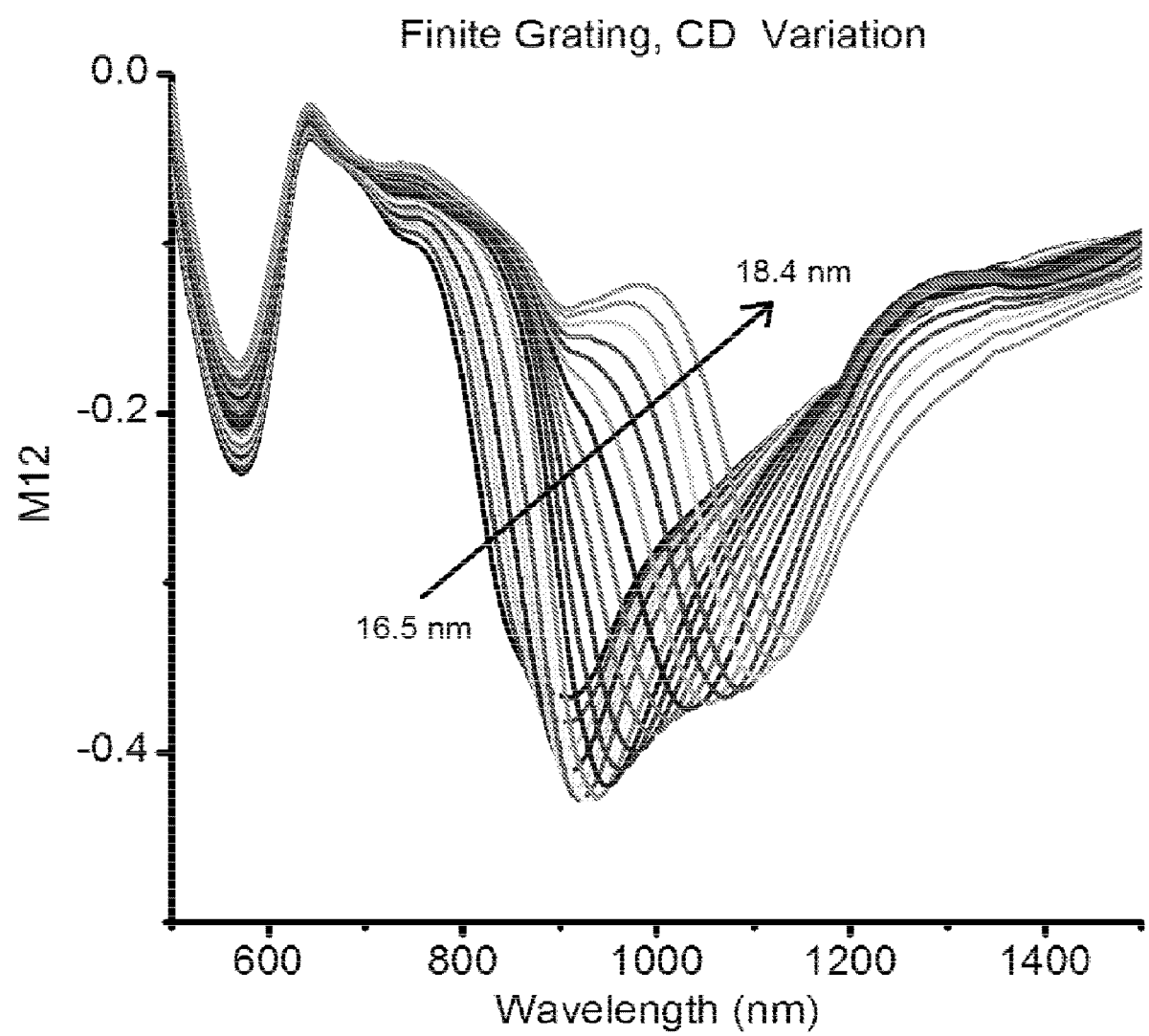
FIG. 8 is a graph of a spectral profile of the metallic grating illustrated in FIG. 7, as set forth herein.

FIG. 8 is a graph of a spectral profile of the metallic grating illustrated in FIG. 7, as set forth herein.

Because of the periodic absences in this structure, in one embodiment localized plasmons can be produced and the dips associated with them are present, similar to the spectral profile of the metallic grating illustrated in FIG. 4A, as shown in FIG. 5.

For instance, in one embodiment, a plasmon, which is a packet of energy sitting in between metallic structures, can complete boundaries. The boundary in the illustrated embodiment of FIG. 7 are the portions where the metallic lines end. In such an embodiment, plasmons can readily be excited, leading to the spectral profile as described below. Importantly, the embodiment of FIG. 7 has resonant-inducing edges.

Due to the change in refractive index and reduced propagation length compared to the metallic grating illustrated in FIG. 4A, the finite grating spectra is slightly blue shifted and more compact. As indicated in Table 2, the structure retains sensitivity only above CD=17.0 nm for the given parameters. In one example, the finite gratings can be directly compared to their cross-grating counterparts. In another example, Angstrom scale sensitivity is demonstrated for the finite grating case.

| | CD | | | | | | | | | | |
|---|---|---|---|---|---|---|---|---|---|---|---|
| | 16.5 | 16.6 | 16.7 | 16.8 | 16.9 | 17.0 | 17.1 | 17.2 | 17.3 | 17.4 | 17.5 |
| Dip location | 906 | 906 | 908 | 908 | 910 | 918 | 929 | 939 | 949 | 964 | 978 |

In Table 2, the minima shifts up 1.2% of its initial location per 1 Å increase in CD on average.

For instance, in one embodiment the surface plasmon polariton dip predicted for the cross-grating can also be seen around $\lambda$=1360 nm though it is barely visible and severely redshifted compared to the expected value of $\lambda$=1200 nm. The presence of the polariton effects can be due to part of the propagating plasmon reflecting at the end of the grating creating a Fabry-Perot resonator. In the discussion of embodiments accompanying FIGS. 16-18, parameters more suitable for viewing the polariton dip are presented and demonstrate enhanced coupling with decreased sensitivity. For a finite grating embodiment, it appears this tradeoff between polariton and localized plasmons is significant to the point that the interaction between the two modes cannot be easily described. In one example, the finite grating may have a different sensitivity as compared to the cross-grating (e.g., metallic grating with crossbar) case.

In addition, in one embodiment, two experimentally realizable structures have extraordinarily sensitive spectral profiles dependent on the critical dimension of extremely thin metallic gratings. Because of its range of sensitivity, the cross-grating (e.g., metallic grating with crossbar) is a good choice for future fabrication. Note that the added pitch for the cross-grating is large enough so that fabrication will not be limited by lithographic constraints.

In one example, variations in roughness, rounding and side wall angle of the metallic gratings may be employed. In another example, metallic gratings without the oxide fill and the TaN barrier layer may be used, and may produce a redshift in the spectra. In further examples, another CD or periodicity may be used, and the oxide fill or material composition could be altered to obtain the required spectral results.

Figure 9A:
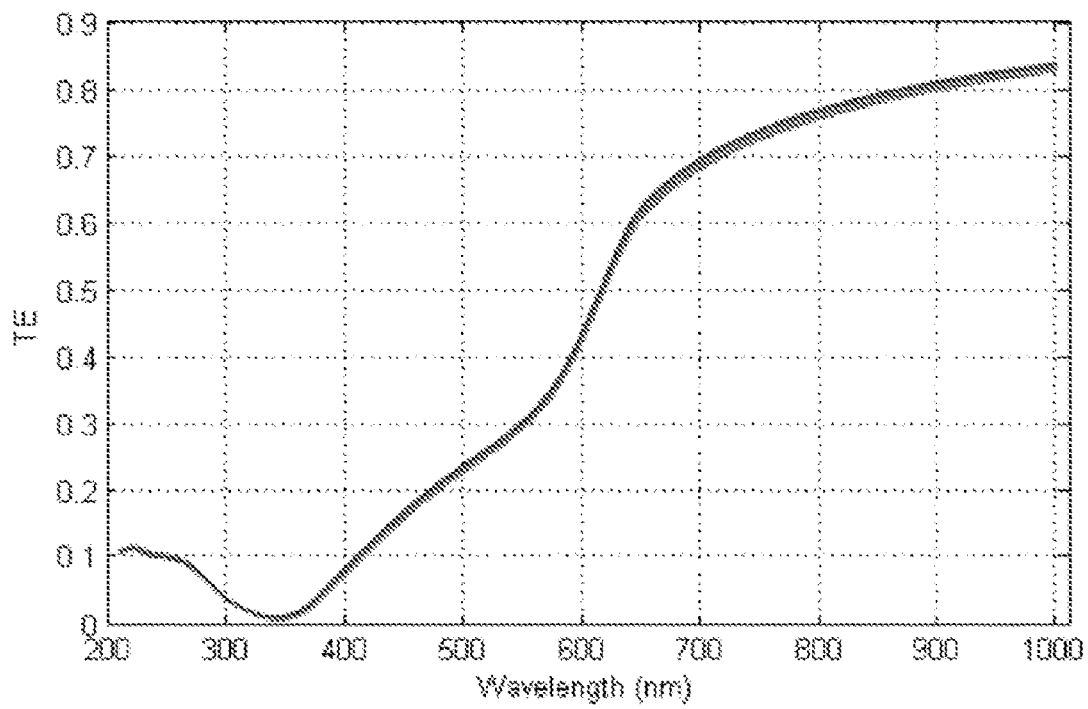
FIGS. 9A & 9B are graphs of spectral profiles of the metallic gratings illustrated in FIGS. 2 & 4 respectively, as set forth herein.
Figure 9B:
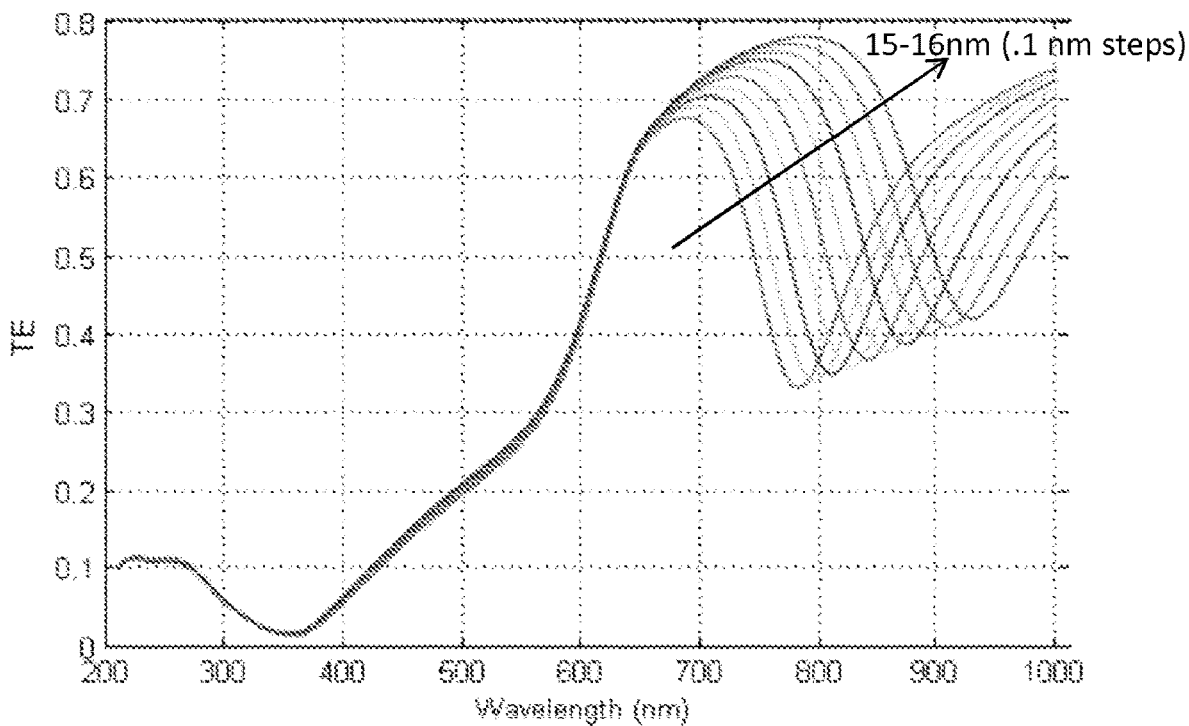

FIGS. 9A-9B are graphs of spectral profiles of the metallic gratings illustrated in FIGS. 2 & 4 respectively, as set forth herein. In the illustrated example, reflectometry, rather than ellipsometry has been employed, corresponding to a 1 nm range in CD (15-16 nm, 0.1 nm steps).

As demonstrated, the metallic grating of FIG. 4A demonstrates the spectral feature of local minima changing as critical dimensions change, allowing for use in high precision measurement of critical dimensions, as described above. Notably, polarized reflectometry equipment may be available at a lower cost than ellipsometry equipment, which demonstrates the further commercial importance of the present techniques.

FIG. 10-15 are plan views illustrating metallic gratings, as set forth herein. Each of the grating patterns of the structures described can be repeated tens, hundreds, or thousands of times in two dimensions (e.g., vertical and horizontal) to define a periodic grating pattern. A metallic grating with periodicity can be employed as part of, for example, a test structure on a semiconductor wafer.

Figure 10:
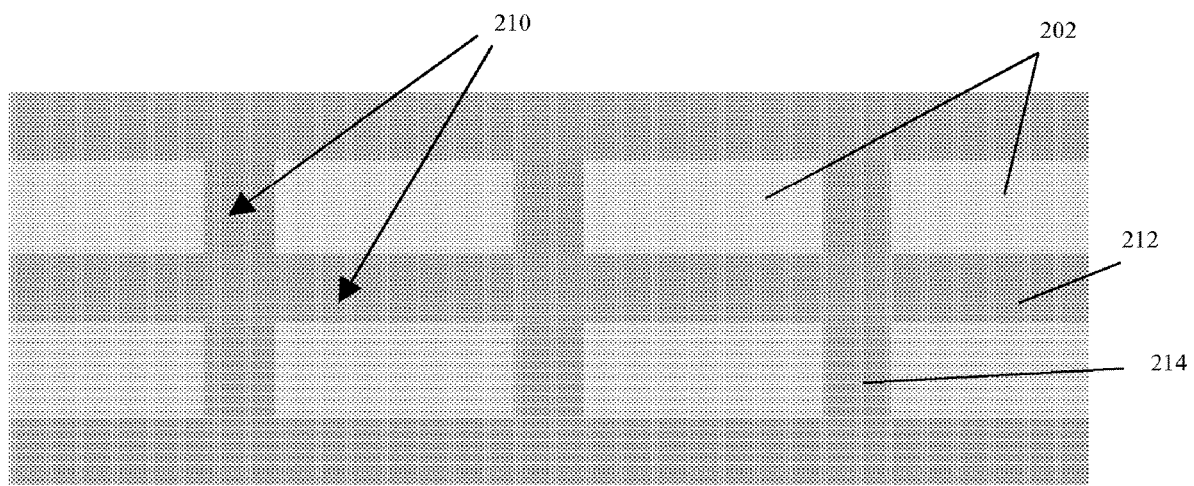
FIG. 10-15 are plan views illustrating metallic gratings having various grating patterns, as set forth herein.

FIG. 10 is a plan view illustrating a metallic grating 210, as set forth herein. As illustrated, metallic grating 210 has a cross-hatch grid pattern. Advantageously, metallic grating 210 as shown in FIG. 10 can allow plasmonic effects to be demonstrated with both p- and s-polarized light simultaneously. In one example, the x and y periods may be varied independently to see different resonant effects, depending on the critical dimensions. In another example, an azimuth of 45° may be used in optical metrology techniques.

In an embodiment according to FIG. 10, a generalized cross gating structure has parameters of a metallic line such as critical dimension, side wall angle, composition which are varied independent of the perpendicular vertical metallic lines 212. In such a case, wider horizontal metallic lines 214 with larger pitch can enhance the characterization of the smaller lines.

Figure 11:
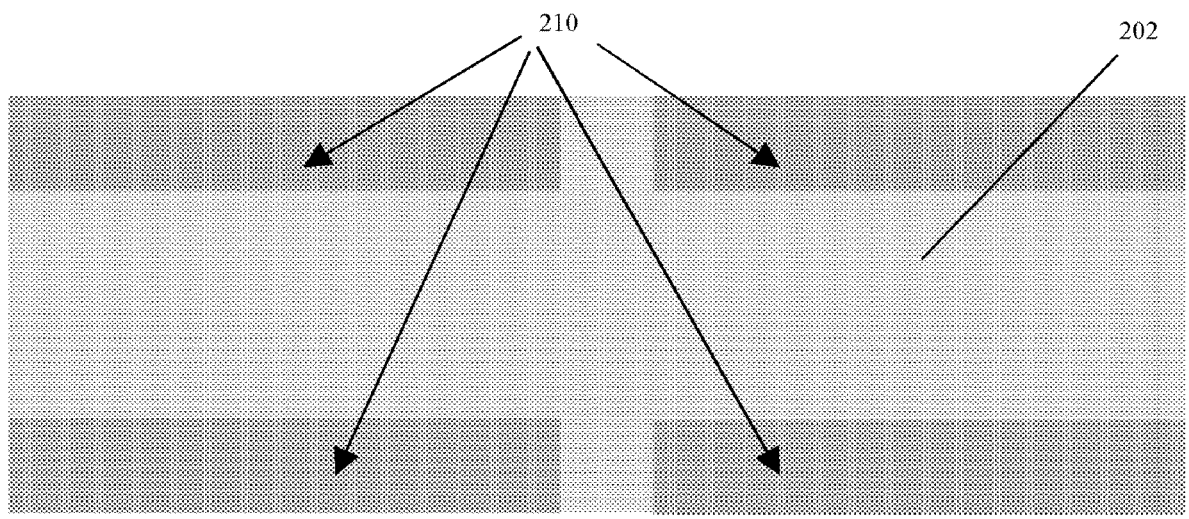

FIG. 11 is a plan view illustrating a metallic grating 210, as set forth herein. Metallic grating 210 as shown in FIG. 11 has a grating pattern with periodic gaps of different sizes in the x and y directions. Advantageously, in one embodiment metallic grating 210 according to the embodiment illustrated in FIG. 11 allows plasmonic effects at different pitch values.

In an embodiment, finite grating may be easier to fabricate because lines are truncating periodically. In such a case, localized plasmons can become confined by the abrupt change in material conditions.

Figure 12:
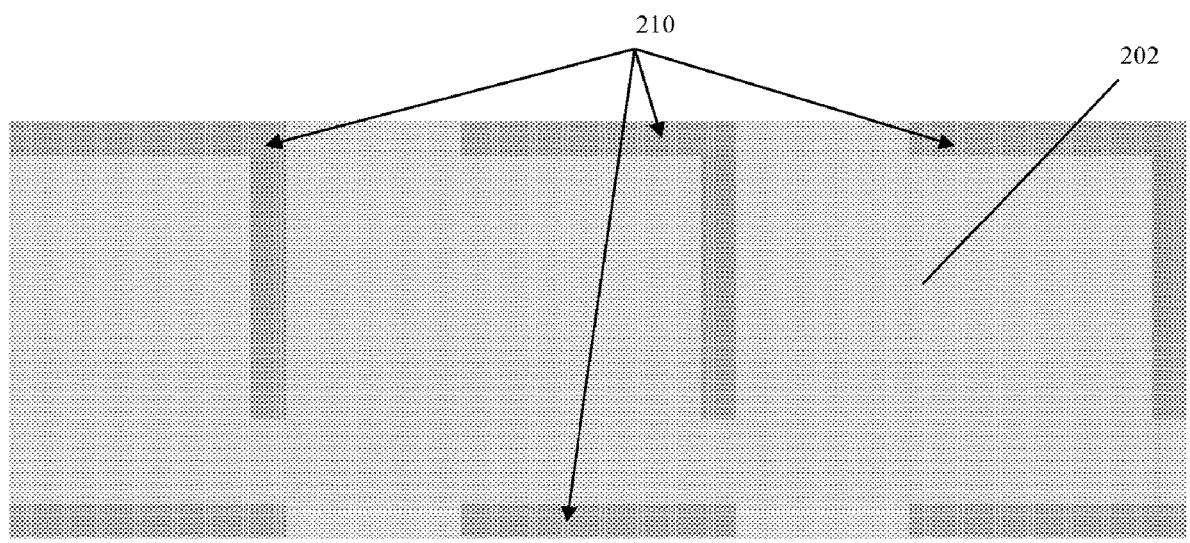

FIG. 12 is a plan view illustrating a metallic grating 210, as set forth herein. As illustrated, metallic grating 210 has a grating pattern including perpendicular line segments. In one embodiment, perpendicular line segments allowing different plasmonic interactions.

In another embodiment, two-dimensional finite grating can demonstrate the effects seen in the simple finite grating at multiple azimuthal angles. In such an embodiment, localized plasmons can be coupled more readily due to geometrical considerations leading to interesting results at azimuthal angles that aren't multiples of $\pi/2$.

Figure 13:
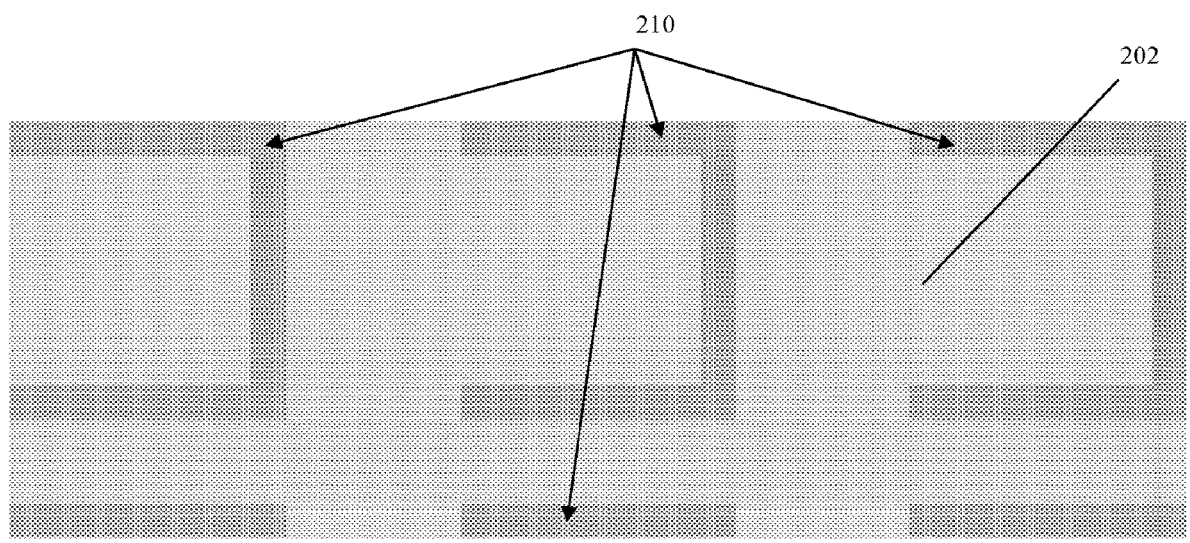

FIG. 13 is a plan view illustrating a metallic grating 210, as set forth herein. As illustrated, metallic grating 210 has additional parallel and perpendicular line segments.

In an embodiment, this structure may be extraordinarily dependent on the spacing between the top and bottom lines due to deviation from the single pitch case. In such a case, interaction between two separate plasmon modes may be induced, leading to interference effects.

Figure 14:
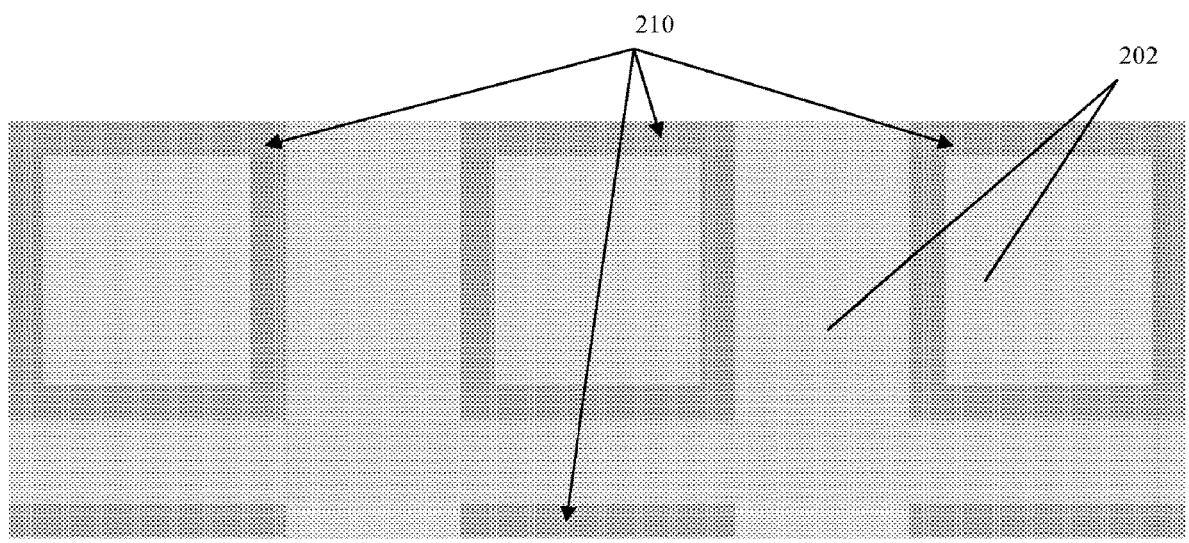

FIG. 14 is a plan view illustrating a metallic grating 210, as set forth herein. Metallic grating 210 as shown in FIG. 14 includes a grating pattern with closed loop, square structures.

In one embodiment, closed loop structures can produce an abundance of plasmonic effects. High confinement of localized plasmons occurs in the closed loops and in the gaps between the loops. In such a case, surface plasmons can propagate regardless of azimuthal angle due to the inherent symmetry of the structure.

Figure 15:
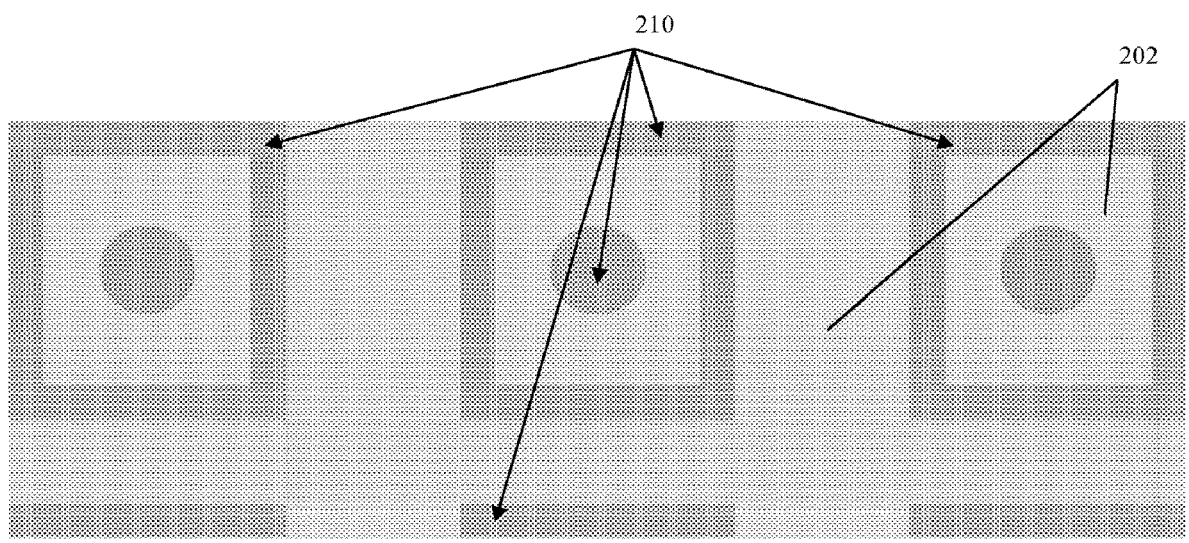

FIG. 15 is a plan view illustrating a metallic grating 210, as set forth herein. Metallic grating 210 as shown in FIG. 15 includes a grating pattern with closed loop, square structures with a pillar, nanosphere or nanorod of metal, and is able to couple to any incoming light regardless of polarization.

In an embodiment, pillars of metal can induce strong localized plasmon modes. Coupled with the plasmon modes of closed loops, substantial plasmonic effects can occur, which is useful for characterization purposes.

Figure 16:
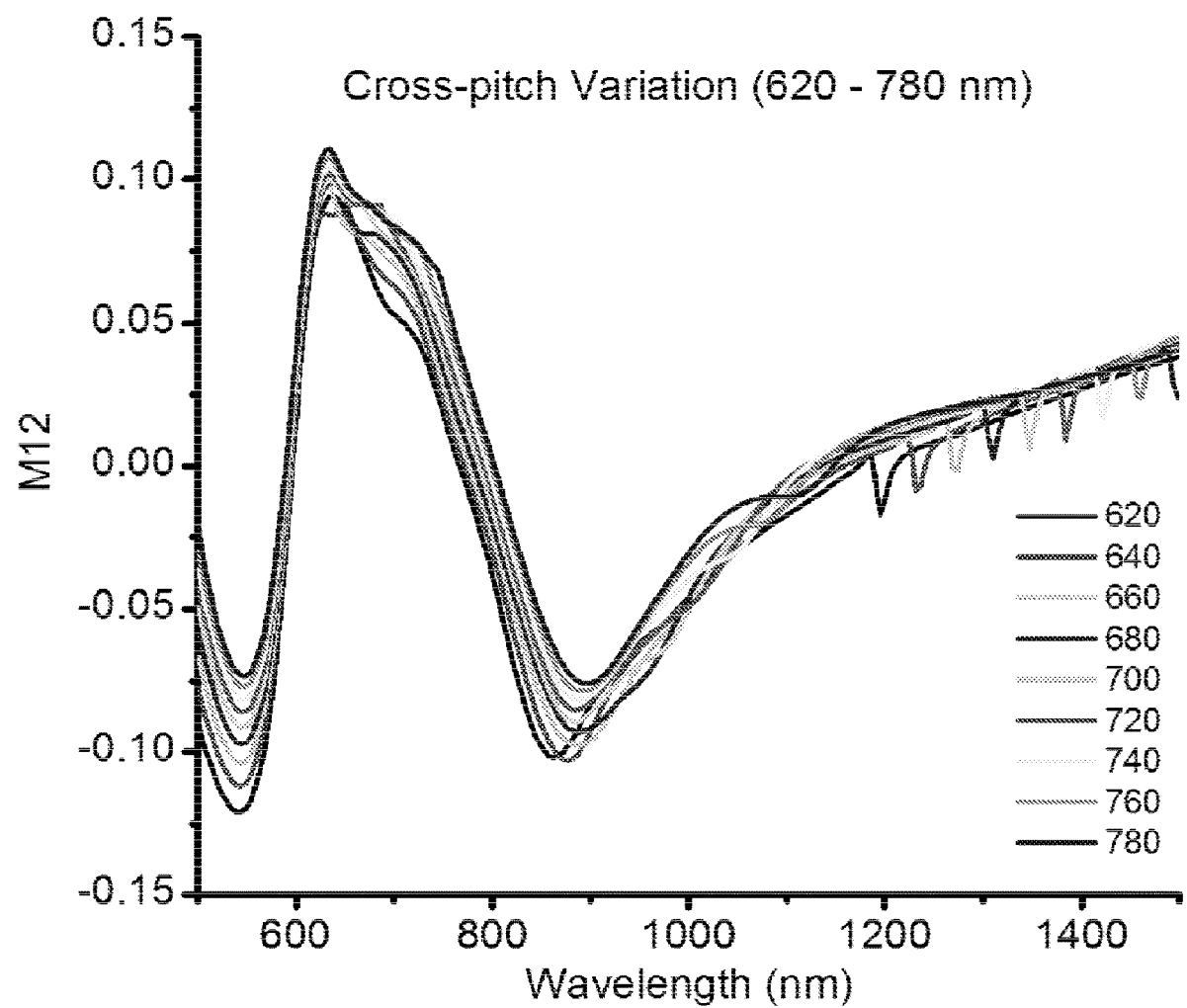
FIG. 16 is a graph of a spectral profile of the metallic grating illustrated in FIG. 4A, as set forth herein.
Figure 17:
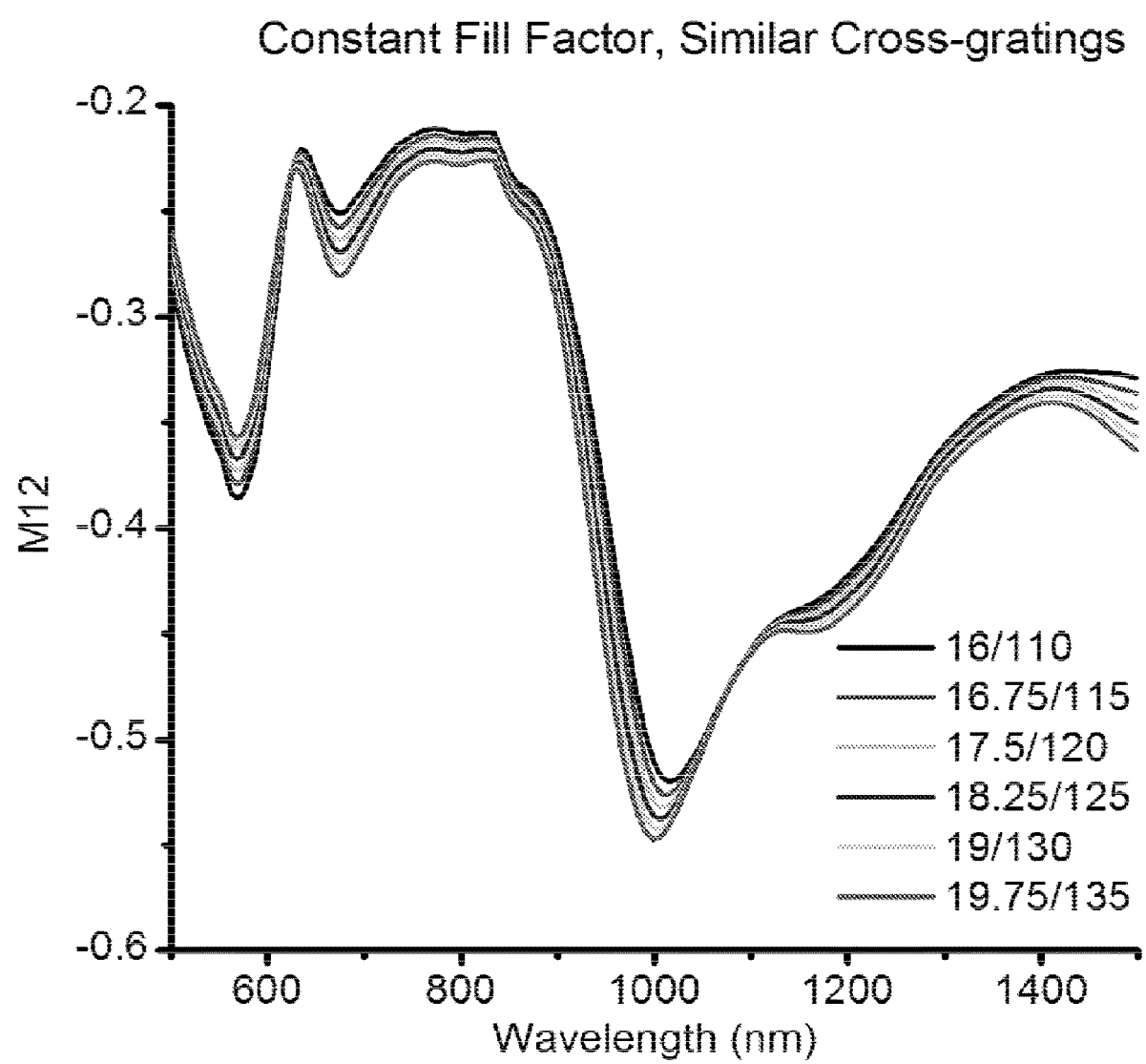
FIG. 17 is a graph of a spectral profile of the metallic grating illustrated in FIG. 4A, as set forth herein.
Figure 18:
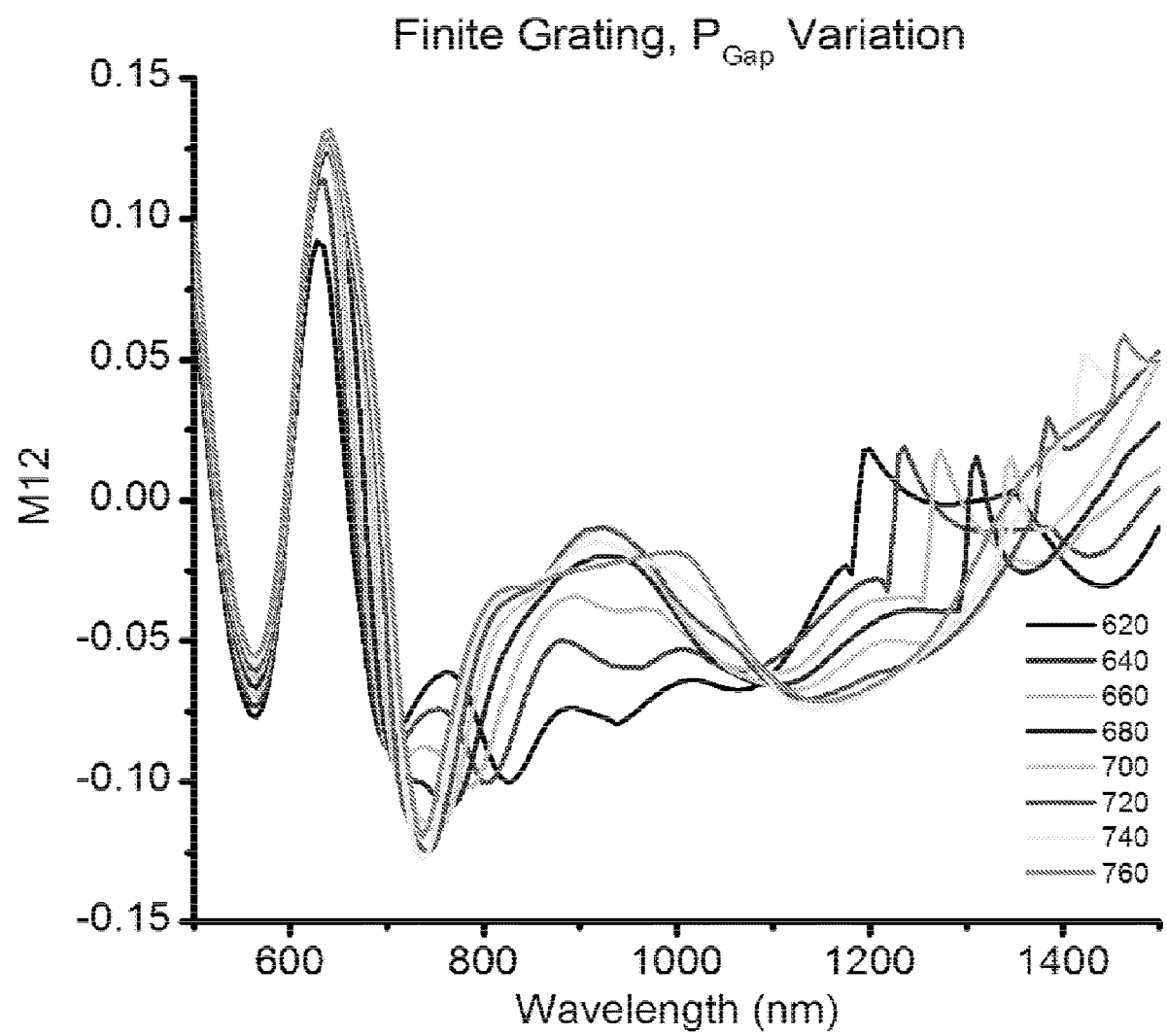
FIG. 18 is a graph of a spectral profile of the metallic grating illustrated in FIG. 7, as set forth herein.

FIGS. 16-18 are graphs of spectral profiles of the metallic gratings described above, as set forth herein. These graphs demonstrate some further points of observations regarding the metallic gratings of the present disclosure.

FIG. 16 is a graph of a spectral profile of the metallic grating illustrated in FIG. 4A, as set forth herein.

Infinite cross-grating, $P_x$=60, CD=18 nm, $L_y$=100 nm. The dips above 1200 nm are due to polariton coupling as described above.

The effect of varying the larger dimension pitch for the cross-grating is illustrated in FIG. 16. As expected, the spectra redshifts with increasing period due to decreased fill factor. Since the larger dimension fills so little space compared to the smaller dimension, variation of this period by 160 nm has only shifted the minima by 25 nm. This graph demonstrates the lack of interaction between the surface plasmon polariton coupling, seen as dips in the spectra above 1200 nm, and the larger localized plasmon response. The polariton coupling can be adequately predicted by [Eq. (1)] as before.

FIG. 17 is a graph of a spectral profile of the metallic grating illustrated in FIG. 4A, as set forth herein. In this example, $P_y$=875 nm, $L_y$=100.

As a demonstration of the importance of fill factor, the ratio of area filled by the grating to the total area, with respect to the sensitivity of the cross-grating, there are presented 6 structures of approximately equal fill factor. The smaller number in the legend represents the CD and the larger number represents the smaller dimension period. This shows that within a few nanometers of CD and tens of nanometers in smaller dimension period, fill factor is one parameter for characterization. Though some differences between the spectra are visible, they would not in practice be easily separable with just $M_{12}$ plots.

FIG. 18 is a graph of a spectral profile of the metallic grating illustrated in FIG. 7, as set forth herein. In this example, $P_x$=60 nm, CD=18 nm, $L_y$=100 nm. Here, the effect of varying the larger dimension pitch for the finite grating is demonstrated. For the given parameters, we see that the finite grating actually has a more prominent surface plasmon polariton response which again can be calculated as before. Because the fill factor is smaller compared to the same parameters for the cross-grating case, the localized plasmon resonance has been shifted to about 1100 nm. It is difficult to distinguish this peak due to the overlap and general disorder of the curves. Apart from the polariton dips, these spectra are thus not as sensitive as others described where a grating pattern changes in one direction, e.g., only in a horizontal direction but not a vertical direction as shown by the grating pattern depicted. In FIG. 2, the illustrated grating pattern can be regarded as a one-dimensional pattern. Where a grating pattern changes in first and second direction (e.g., both in the horizontal and the vertical directions) as shown by the grating patterns depicted in FIGS. 4A-4D, FIG. 7, and FIGS. 10-15, the grating pattern can be regarded as a two-dimensional grating pattern. In any of the embodiments herein where a grating pattern is illustrated, the grating pattern can be repeated, e.g. tens, hundreds, or thousands of times to define a periodic grating pattern.

A small sample of apparatus systems and methods set forth herein include the following:

A1. A structure comprising:
a metallic grating having a grating pattern, the metallic grating including a critical dimension;
wherein the metallic grating outputs a spectral profile when exposed to electromagnetic radiation, the spectral profile having a feature;
wherein the grating pattern is configured so that a change of the critical dimension produces a shift in a value of the feature of the spectral profile.

A2. The structure of A1, wherein the feature of the spectral profile comprises a local minimum or maximum of the spectral profile.

A3. The structure of A1, wherein the feature of the spectral profile comprises a peak of the spectral profile.

A4. The structure of A1, wherein the feature of the spectral profile comprises a local minimum peak of the spectral profile.

A5. The structure of A1, wherein the feature of the spectral profile comprises a local maximum peak of the spectral profile.

A6. The structure of A1, wherein the critical dimension has a value of less than 100 nm.

A7. The structure of A1, wherein the critical dimension has a value of less than 25 nm.

A8. The structure of A1, wherein the critical dimension has a value of less than 17 nm.

A9. The structure of A1, wherein the grating pattern is configured so that the feature of the spectral profile shifts by more than 1% per 1 Å change in the critical dimension.

A10. The structure of A1, wherein the grating pattern is configured so that the feature of the spectral profile shifts by more than 1.5% per 1 Å change in the critical dimension.

A11. The structure of A1, wherein the grating pattern is configured so that the feature of the spectral profile shifts by more than 2% per 1 Å change in the critical dimension.

A12. The structure of A1, wherein the grating pattern is configured so that the feature of the spectral profile shifts by more than 2.5% per 1 Å change in the critical dimension.

A13. The structure of A1, wherein the metallic grating comprises a periodically repeating pattern of metallic lines.

A14. The structure of A13, wherein the periodically repeating pattern of metallic lines comprises periodic gaps in the metallic lines.

A15. The structure of A13, wherein the metallic grating comprises at least one metallic crossbar, the at least one metallic crossbar electrically contacting some of the metallic lines.

A16. The structure of A1, wherein the metallic grating comprises multiple metallic loops.

A17. The structure of A1, wherein the metallic grating comprises multiple metallic pillars.

A18. The structure of A1, wherein the metallic grating comprises at least one plasmonic material.

A19. The structure of A1, wherein the metallic grating comprises copper, cobalt, or an alloy thereof.

A20. The structure of A1, further comprising a substrate, wherein the metallic grating is disposed over the substrate.

A21. The structure of A20, wherein the substrate comprises a semiconductor material.

A22. The structure of A1, wherein an isolation material is disposed around the metallic grating.

A23. The structure of A1, wherein a barrier layer material layer is disposed over the metallic grating.

A24. The structure of A1, wherein the grating pattern is characterized by vertical metallic lines and horizontal lines selected from the group of horizontal metallic lines and horizontal gaps.

A25. The structure of A1, wherein the grating pattern is characterized by vertical lines and horizontal lines, the vertical lines having linewidths of less than 100 nm, the horizontal lines having a pitch of greater than 100 nm.

A26. The structure of A1, wherein the grating pattern is characterized by vertical lines and horizontal lines, the vertical lines having linewidths of less than 50 nm, and a pitch of less than 100 nm, the horizontal lines having a pitch of greater than 200 nm.

A27. The structure of A1, wherein the grating pattern is characterized by vertical lines and horizontal lines, the vertical lines having linewidths of less than 20 nm, and a pitch of less than 100 nm, the horizontal lines having a pitch of greater than 500 nm.

A28. The structure of A1, wherein the grating pattern is a periodic two dimensional grating pattern.

A29. The structure of claim A1, wherein the structure includes a second metallic grating aligned to the metallic grating and outputting a spectral profile coordinated with the spectral profile output by the metallic grating.

A30. The structure of claim A1, wherein the metallic grating is defined by a circuit element under test.

A31. The structure of claim A1, wherein the structure includes a circuit element under test and wherein the metallic grating is disposed spatially separate from a circuit element under test.

B1. A structure comprising:
a metallic grating having a grating pattern, the metallic grating including a critical dimension;
wherein the metallic grating outputs a spectral profile when exposed to electromagnetic radiation, the spectral profile having a feature;
wherein the grating pattern is configured so that a wavelength of the feature shifts by more than 1% per 1 Å change in the critical dimension.

B2. The structure of B1, wherein the grating pattern is characterized by vertical metallic lines and horizontal lines selected from the group of horizontal metallic lines and horizontal gaps.

B3. The structure of B1, wherein the grating pattern is characterized by vertical lines and horizontal lines, the vertical lines having linewidths of less than 100 nm, the horizontal lines having a pitch of greater than 100 nm.

B4. The structure of B1, wherein the grating pattern is characterized by vertical lines and horizontal lines, the vertical lines having linewidths of less than 50 nm, and a pitch of less than 100 nm, the horizontal lines having a pitch of greater than 200 nm.

B5. The structure of B1, wherein the grating pattern is characterized by vertical lines and horizontal lines, the vertical lines having linewidths of less than 20 nm, and a pitch of less than 100 nm, the horizontal lines having a pitch of greater than 500 nm.

C.1. A semiconductor structure comprising:
multiple circuit device structures supported on a substrate; and a test structure supported on the substrate, the test structure comprising a metallic grating, the metallic grating having a two dimensional periodic grating pattern.

C2. The structure of C1, wherein the grating comprises at least one metallic crossbar, the at least one metallic crossbar electrically contacting some of the multiple metallic lines.

C3. The structure of C1, wherein the grating comprises multiple metallic loops.

C4. The structure of C1, wherein the grating comprises multiple metallic pillars.

C5. The structure of C1, wherein the grating pattern is characterized by vertical metallic lines and horizontal lines selected from the group of horizontal metallic lines and horizontal gaps.

C6. The structure of C1, wherein the grating pattern is characterized by vertical lines and horizontal lines, the vertical lines having linewidths of less than 100 nm, the horizontal lines having a pitch of greater than 100 nm.

C7. The structure of C1, wherein the grating pattern is characterized by vertical lines and horizontal lines, the vertical lines having linewidths of less than 50 nm, and a pitch of less than 100 nm, the horizontal lines having a pitch of greater than 200 nm.

C8. The structure of C1, wherein the grating pattern is characterized by vertical lines and horizontal lines, the vertical lines having linewidths of less than 20 nm, and a pitch of less than 100 nm, the horizontal lines having a pitch of greater than 500 nm.

C9. The structure of C1, wherein the semiconductor structure is a semiconductor wafer.

C10. The structure of C1, wherein the semiconductor structure is a die.

C11. The structure of C1, wherein the multiple circuit device structures are provided by FETs.

D1. A method comprising:
propagating input electromagnetic radiation onto a metallic grating having a two dimensional periodic grating pattern; and
measuring a critical dimension of the metallic grating using output electromagnetic radiation from the metallic grating.

D2. The method of D1, wherein the method comprises using spectroscopic ellipsometry.

D3. The method of D1, wherein the determining includes measuring a frequency minimum of at least one Mueller matrix element of the metallic grating.

D4. The method of D1, wherein the method includes using polarized reflectometry.

D5. The method of D1, wherein the method includes measuring line widths and sidewall angles of the metallic grating.

D6. The method of D1, wherein the metallic grating comprises a periodically repeating pattern of metallic lines.

D7. The method of D6, wherein the metallic grating comprises at least one metallic crossbar, the at least one metallic crossbar electrically contacting some of the metallic lines.

D8. The method of D6, wherein the periodically repeating pattern of metallic lines comprises periodic gaps in the metallic lines.

D9. The method of D1, wherein the metallic grating comprises multiple metallic loops.

D10. The method of D1, wherein the metallic grating comprises multiple metallic pillars.

D11. The method of D1, wherein the method includes fabricating the grating on a substrate that supports a semiconductor circuit characterized by multiple semiconductor circuit devices and metallic lines.

D12. The method of D1, wherein the method includes fabricating the grating on a substrate that supports a semiconductor circuit, the semiconductor circuit characterized by multiple semiconductor circuit devices and metallic lines, and using a result of the measuring to determine a critical dimension of the semiconductor circuit.

Additional aspects of apparatus, systems and methods herein are set forth in Appendix A entitled "Enhancing One Dimensional Sensitivity with Plasmonic Coupling" included as part of U.S. Provisional App. No. 62/047,626 filed Sep. 8, 2014, which is incorporated herein by reference in its entirety.

Additional aspects of apparatus, systems and methods herein are set forth in Appendix B entitled "Designing Plasmonic Test Structures for Optical Metrology" included as part of U.S. Provisional App. No. 62/047,626 filed Sep. 8, 2014, which is incorporated herein by reference in its entirety.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of one or more aspects of the disclosure and the practical application, and to enable others of ordinary skill in the art to understand one or more aspects of the disclosure for various embodiments with various modifications as are suited to the particular use contemplated.

What is claimed is:

1. A structure comprising:
a metallic grating having a grating pattern, the metallic grating including a critical dimension;
wherein the metallic grating outputs a spectral profile when exposed to electromagnetic radiation, the spectral profile having a feature;

wherein the grating pattern is configured so that a change of the critical dimension produces a shift in a value of the feature of the spectral profile, and wherein the grating pattern is characterized by vertical metallic lines and horizontal lines selected from the group consisting of horizontal metallic lines and horizontal gaps, wherein the horizontal lines include horizontal metallic lines, wherein the grating pattern is characterized by the horizontal metallic lines cross connecting the vertical metallic lines, wherein the structure includes a circuit element under test disposed within a circuit area, the circuit element under test having circuit element metallic lines, wherein the metallic grating has linewidths in common with linewidths of the circuit element metallic lines, and wherein the metallic grating is disposed spatially separate from the circuit element under test in a test area that is spatially separate from the circuit area.

2. The structure of claim 1, wherein the feature of the spectral profile comprises a local minimum peak of the spectral profile.

3. The structure of claim 1, wherein the critical dimension has a value of less than 17 nm.

4. The structure of claim 1, wherein the grating pattern is configured so that the feature of the spectral profile shifts by more than 1% per 1 Å change in the critical dimension.

5. The structure of claim 1, wherein the grating pattern is configured so that the feature of the spectral profile shifts by more than 2.5% per 1 Å change in the critical dimension.

6. The structure of claim 1, wherein the metallic grating comprises a periodically repeating pattern of metallic lines.

7. The structure of claim 6, wherein the periodically repeating pattern of metallic lines comprises periodic gaps in the metallic lines.

8. The structure of claim 6, wherein the metallic grating comprises at least one metallic crossbar, the at least one metallic crossbar electrically contacting some of the metallic lines.

9. The structure of claim 1, wherein the metallic grating comprises multiple metallic pillars.

10. The structure of claim 1, wherein an isolation material is disposed around the metallic grating.

11. The structure of claim 1, the vertical metallic lines having linewidths of less than 100 nm, the horizontal lines having a pitch of greater than 100 nm.

12. The structure of claim 1, the vertical metallic lines having linewidths of less than 20 nm, and a pitch of less than 100 nm, the horizontal lines having a pitch of greater than 500 nm.

13. The structure of claim 1, wherein the structure includes a second metallic grating aligned to the metallic grating and outputting a spectral profile coordinated with the spectral profile output by the metallic grating.

14. The structure of claim 1, wherein the grating pattern is characterized by the horizontal lines extending through the vertical metallic lines.

15. The structure of claim 1, wherein the grating pattern is characterized by the horizontal lines extending through the vertical metallic lines, wherein the vertical metallic lines are periodically repeating vertical metallic lines, and wherein the horizontal lines are periodically repeating horizontal lines.

16. A structure comprising:
a metallic grating having a grating pattern, the metallic grating including a critical dimension;

wherein the metallic grating outputs a spectral profile when exposed to electromagnetic radiation, the spectral profile having a feature; and wherein the grating pattern is configured so that a wavelength of the feature shifts by more than 1% per 1 Å change in the critical dimension.

17. A structure comprising:
a semiconductor circuit;
a grating having a grating pattern and including a critical dimension, the grating being supported by a substrate and being adapted for use in performing analysis of the semiconductor circuit;

wherein the grating outputs a spectral profile when exposed to electromagnetic radiation, the spectral profile having a feature; and wherein the grating pattern is configured so that when the critical dimension deviates from a targeted value there is produced a shift in a value of the feature of the spectral profile from a value that is indicative of the critical dimension having the targeted value;

wherein the semiconductor circuit is supported by the substrate, wherein the grating pattern is characterized by first metallic lines and second metallic lines perpendicularly cross connecting the first metallic lines, and wherein the grating is electrically isolated from the substrate.

18. The structure of claim 17, wherein the structure includes a circuit element under test and wherein the grating is a metallic grating disposed spatially separate from a circuit element under test.

19. The structure of claim 17, wherein the grating pattern is characterized by the horizontal metallic lines cross connecting vertical metallic lines, wherein the structure includes a circuit element under test disposed within a circuit area, the circuit element under test having circuit element metallic lines, wherein the grating has linewidths in common with linewidths of the circuit element metallic lines, and wherein the grating is disposed spatially separate from the circuit element under test in a test area that is spatially separate from the circuit area.

20. The structure of claim 17, wherein the semiconductor circuit includes metallic lines, wherein metallic lines of the semiconductor circuit and the first metallic lines of the grating pattern are characterized by being formed by a common process.

21. The structure of claim 17, wherein the feature of the spectral profile comprises a local minimum peak of the spectral profile.

22. The structure of claim 17, wherein the spectral profile includes a local minimum having a wavelength of at least 500 nm.

23. The structure of claim 17, wherein the grating pattern is characterized by having a linewidth that is coordinated with a pitch by being within a range of linewidths at which plasmonic resonance is observable in the spectral profile, wherein the linewidth defines the critical dimension.

24. The structure of claim 17, wherein the grating pattern is characterized by vertical metallic lines including the first metallic lines and horizontal lines including the second metallic lines, wherein a pitch of the horizontal lines is approximately an order of magnitude larger than a pitch of the vertical metallic lines, wherein a linewidth of the horizontal lines is approximately an order of magnitude larger than a linewidth of the vertical metallic lines, wherein the horizontal lines have a pitch in the range of from about 600 nm-1200 nm and a linewidth in the range of from about 100 nm-350 nm, wherein the vertical lines have a linewidth in the range of from about 10 nm-35 nm.

25. The structure of claim 17, wherein the grating comprises a periodically repeating pattern of metallic lines, wherein the periodically repeating pattern is a two-dimensional repeating pattern that comprises periodic gaps in the metallic lines.

26. The structure of claim 17, wherein the grating comprises a periodically repeating pattern of metallic lines, wherein the periodically repeating pattern is a two-dimensional repeating pattern that comprises vertical metallic lines and horizontal metallic lines.

27. The structure of claim 17, wherein the grating pattern is a two-dimensional periodic grating pattern.

28. The structure of claim 17, wherein the grating comprises multiple metallic loops.

29. The structure of claim 17, wherein the structure includes a second grating aligned to the grating, wherein the second grating is configured to output a second spectral profile when exposed to electromagnetic radiation, the second spectral profile being coordinated with the spectral profile by being in non-overlapping or reduced overlapping relation to the spectral profile.

30. The structure of claim 17, wherein the structure includes a second grating aligned to the grating, wherein the second grating is configured to output a second spectral profile when exposed to electromagnetic radiation, wherein the grating and the second grating have one or more of different pitches or different linewidths for coordination between the second spectral profile and the spectral profile so that the second spectral profile is distinguishable from the spectral profile.

31. The structure of claim 17, wherein the structure includes a second grating and a third grating aligned to the grating, wherein the second and third grating are configured to output, respectively, second and third spectral profiles when exposed to electromagnetic radiation, wherein the spectral profile, the second spectral profile, and the third spectral profile are coordinated with one another by being in non-overlapping or reduced overlapping relation to one another.

32. The structure of claim 17, wherein the grating includes a material capable of supporting plasmonic effects.

33. The structure of claim 17, wherein the grating is configured so that plasmonic resonance is observable in the spectral profile.

34. The structure of claim 17, wherein the feature of the spectral profile is a first peak and wherein the spectral profile includes a second feature provided by a second peak, wherein the grating pattern is configured so that when the critical dimension deviates from a targeted value there is produced a shift in a value of the second peak of the spectral profile from a value that is indicative of the critical dimension having the targeted value.

35. The structure of claim 17, wherein the grating pattern is configured so that the feature of the spectral profile shifts by more than 1% per 1 Å deviation of the critical dimension from the target value.

36. The structure of claim 17, wherein the grating pattern is configured so that the feature of the spectral profile shifts by more than 10 nm per 1 Å deviation of the critical dimension from the target value.

37. The structure of claim 17, wherein the critical dimension has a value of less than 100 nm.

38. The structure of claim 17, wherein the grating pattern is characterized by vertical lines including the first metallic lines and horizontal lines including the second metallic lines, the vertical lines having linewidths of less than 100 nm, the horizontal lines having a pitch of greater than 100 nm.

39. The structure of claim 17, wherein the grating pattern is characterized by vertical lines including the first metallic lines and horizontal lines including the second metallic lines, the vertical lines having linewidths of less than 20 nm, and a pitch of less than 100 nm, the horizontal lines having a pitch of greater than 500 nm.

40. The structure of claim 17, wherein the grating comprises a periodically repeating pattern, the periodically repeating pattern having a plurality of metallic lines and at least one metallic crossbar, the at least one metallic crossbar electrically contacting metallic lines of the plurality of metallic lines.

41. The structure of claim 17, wherein the grating is one of the following selected from the group consisting of: (a) co-located with the semiconductor circuit (b) co-located with and defined by the semiconductor circuit; (c) spatially separated from the semiconductor circuit.

42. The structure of claim 17, wherein the structure includes an isolation material disposed around the grating, and a conductive layer for preventing diffusion of material of the grating.

43. The structure of claim 17, wherein the grating pattern comprises a plurality of metallic lines including the first metallic lines and at least one metallic crossbar provided by a metallic line of the second metallic lines, the at least one metallic crossbar electrically contacting metallic lines of the plurality of metallic lines.

44. The structure of claim 17, wherein the grating comprises a plurality of metallic lines including the first metallic lines and a plurality of metallic crossbars including the second metallic lines, wherein metallic crossbars of the plurality of metallic crossbars electrically contact metallic lines of the plurality of metallic lines.

45. The structure of claim 17, wherein the grating pattern is characterized by vertical metallic lines including the first metallic lines and horizontal lines including the second metallic lines, wherein a pitch of the horizontal lines is approximately an order of magnitude greater than a pitch of the vertical metallic lines.

46. The structure of claim 17, wherein the grating pattern is characterized by vertical metallic lines including the first metallic lines and horizontal lines including the second metallic lines, wherein a linewidth of the horizontal lines is approximately an order of magnitude greater than a linewidth of the vertical metallic lines.

47. The structure of claim 17, wherein the grating pattern is characterized by vertical metallic lines including the first metallic lines and horizontal lines including the second metallic lines, wherein a pitch of the horizontal lines is approximately an order of magnitude greater than a pitch of the vertical metallic lines, wherein a linewidth of the horizontal lines is approximately an order of magnitude greater than a linewidth of the vertical metallic lines.

48. The structure of claim 17, wherein the grating includes a metallic material.

49. The structure of claim 48, wherein the metallic material includes a non-metal.

50. The structure of claim 48, wherein the metallic material is a metal alloy.

51. The structure of claim 17, wherein the feature of the spectral profile comprises a local minimum peak of the spectral profile, and wherein the grating pattern is configured so that when the critical dimension deviates from the targeted value the local minimum peak of the spectral profile shifts from a first value to a second value, wherein the first value and the second value each exceeds 600 nm.

52. The structure of claim 17, wherein the grating pattern is characterized by vertical metallic lines including the first metallic lines and horizontal lines including the second metallic lines extending through the vertical metallic lines.

53. The structure of claim 17, wherein the grating pattern is characterized by vertical metallic lines including the first metallic lines and horizontal lines including the second metallic lines extending through the vertical metallic lines, wherein the horizontal lines are periodically repeating horizontal lines.

54. The structure of claim 17, wherein the semiconductor circuit includes interconnect lines having an interconnect line critical dimension in common with the critical dimension of the grating pattern, wherein the structure is configured so that when the critical dimension of the grating pattern deviates from a targeted value there is produced a shift in a value of the feature of the spectral profile from a value that is indicative of the interconnect line critical dimension having the targeted value.

55. The structure of claim 17, wherein the semiconductor circuit includes contact lines having a contact line critical dimension in common with the critical dimension of the grating pattern, wherein the structure is configured so that when the critical dimension of the grating pattern deviates from a targeted value there is produced a shift in a value of the feature of the spectral profile from a value that is indicative of the contact line critical dimension having the targeted value.

56. The structure of claim 1, wherein the grating is electrically isolated from a substrate supporting the grating.

57. The structure of claim 17, wherein the first metallic lines and the second metallic lines extend in a common plane.

58. The structure of claim 17, wherein the first metallic lines and the second metallic lines extend in a common plane, the common plane extending substantially parallel to a plane of the substrate.

59. The structure of claim 17, wherein respective ones of the first metallic lines have surfaces extending in a first plane, and wherein respective ones of the second metallic lines have surfaces extending in the first plane, the first plane extending substantially parallel to a plane of the substrate.

60. A structure comprising:
a metallic grating having a grating pattern, the metallic grating including a critical dimension;
wherein the metallic grating outputs a spectral profile when exposed to electromagnetic radiation, the spectral profile having a feature;
wherein the grating pattern is configured so that a change of the critical dimension produces a shift in a value of the feature of the spectral profile; and
wherein the structure includes a second metallic grating aligned to the metallic grating and outputting a spectral profile coordinated with the spectral profile output by the metallic grating.

61. A structure comprising:
a semiconductor circuit;
a grating having a grating pattern and including a critical dimension, the grating being supported by a substrate and being adapted for use in performing analysis of the semiconductor circuit;
wherein the grating outputs a spectral profile when exposed to electromagnetic radiation, the spectral profile having a feature; and
wherein the grating pattern is configured so that when the critical dimension deviates from a targeted value there is produced a shift in a value of the feature of the spectral profile from a value that is indicative of the critical dimension having the targeted value,
wherein the spectral profile includes a local minimum having a wavelength of at least 500 nm.

62. A structure comprising:
a semiconductor circuit;
a grating having a grating pattern and including a critical dimension, the grating being supported by a substrate and being adapted for use in performing analysis of the semiconductor circuit;
wherein the grating outputs a spectral profile when exposed to electromagnetic radiation, the spectral profile having a feature; and
wherein the grating pattern is configured so that when the critical dimension deviates from a targeted value there is produced a shift in a value of the feature of the spectral profile from a value that is indicative of the critical dimension having the targeted value,
wherein the grating pattern is characterized by having a linewidth that is coordinated with a pitch by being within a range of linewidths at which plasmonic resonance is observable in the spectral profile, wherein the linewidth defines the critical dimension.

* * * * *